US012021666B2

(12) United States Patent
Gao et al.

(10) Patent No.: US 12,021,666 B2
(45) Date of Patent: Jun. 25, 2024

(54) BLIND DETECTION METHOD AND APPARATUS

(71) Applicant: Huawei Technologies Co., Ltd., Shenzhen (CN)

(72) Inventors: Fei Gao, Shanghai (CN); Shurong Jiao, Shanghai (CN); Meng Hua, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 148 days.

(21) Appl. No.: 17/487,859

(22) Filed: Sep. 28, 2021

(65) Prior Publication Data

US 2022/0029862 A1    Jan. 27, 2022

Related U.S. Application Data

(63) Continuation of application No. PCT/CN2020/081936, filed on Mar. 28, 2020.

(30) Foreign Application Priority Data

Mar. 29, 2019 (CN) .......................... 201910252628.3
Apr. 3, 2019 (CN) .......................... 201910268022.9

(51) Int. Cl.
*H04L 25/02* (2006.01)
*H04L 5/00* (2006.01)
*H04W 72/23* (2023.01)

(52) U.S. Cl.
CPC ........ *H04L 25/0238* (2013.01); *H04L 5/0078* (2013.01); *H04W 72/23* (2023.01)

(58) Field of Classification Search
None
See application file for complete search history.

(56) References Cited

U.S. PATENT DOCUMENTS 9,504,028 B2   11/2016   Pan et al.
2010/0290418 A1   11/2010   Nishio et al.
(Continued)

FOREIGN PATENT DOCUMENTS

CN   102740473 A   10/2012
CN   105991218 A   10/2016
(Continued)

OTHER PUBLICATIONS

Samsung, "Remaining Issues on Search Soace Design", 3GPP TSG RAN WG1 Meeting 91, R1-1720320, Nov. 27-Dec. 1, 2017, 7 Pages, Reno, USA.
(Continued)

*Primary Examiner* — Clemence S Han
(74) *Attorney, Agent, or Firm* — Slater Matsil, LLP

(57) ABSTRACT

Embodiments of this application provide a blind detection method. A terminal side device receives first indication information from a network side device, where the first indication information is used to determine at least one of N time units, a first time unit in the N time units corresponds to a type of terminal operation, the terminal operation is not performing a first operation, a second operation, and a third operation, the N time units belong to a same transmission time unit, and any one of the N time units includes at least one symbol, where N is an integer greater than 0. The terminal side device determines the N time units based on the first indication information, and performs the corresponding terminal operation in the first time unit in the N time units.

16 Claims, 5 Drawing Sheets

(56) References Cited

U.S. PATENT DOCUMENTS

| | | | |
|---|---|---|---|
| 2014/0185537 | A1 | 7/2014 | Papasakellariou |
| 2019/0215098 | A1* | 7/2019 | Tiirola ................. H04W 24/08 |
| 2019/0223164 | A1* | 7/2019 | He ..................... H04L 25/0204 |
| 2019/0253308 | A1* | 8/2019 | Huang ............... H04L 43/0823 |
| 2020/0169991 | A1* | 5/2020 | Lin ...................... H04W 72/56 |
| 2020/0314678 | A1* | 10/2020 | Lee ...................... H04W 72/12 |
| 2020/0404669 | A1* | 12/2020 | Seo ..................... H04L 25/0238 |
| 2021/0028883 | A1* | 1/2021 | Wang .................. H04L 5/0053 |
| 2021/0050936 | A1* | 2/2021 | Seo ...................... H04L 5/0053 |
| 2021/0136770 | A1* | 5/2021 | Nakashima ........... H04W 72/53 |
| 2021/0168781 | A1* | 6/2021 | Lee ....................... H04W 72/23 |
| 2021/0168782 | A1* | 6/2021 | Hamidi-Sepehr .......................... H04W 72/0446 |
| 2021/0320821 | A1* | 10/2021 | Lee ....................... H04W 56/00 |
| 2021/0351865 | A1* | 11/2021 | Ouchi ..................... H04W 8/24 |
| 2021/0352501 | A1* | 11/2021 | Taherzadeh Boroujeni ................ H04W 24/08 |
| 2022/0167266 | A1* | 5/2022 | Nimbalker ............ H04W 72/20 |
| 2023/0025637 | A1* | 1/2023 | He ....................... H04L 5/0053 |

FOREIGN PATENT DOCUMENTS

| | | |
|---|---|---|
| CN | 109151898 A | 1/2019 |
| CN | 109474384 A | 3/2019 |
| WO | 2017066967 A1 | 4/2017 |

OTHER PUBLICATIONS

Qualcomm Incorporated, "Remaining issues on control resource set and search space", 3GPP TSG RAN WG1 #91, R1-1720676, Nov 27-Dec. 1, 2017, 5 pages, Reno, USA.

ZTE et al., "NR PDCCH search space and number of BDs/CCEs per slot", 3GPP TSG RAN WG1 Meeting #91, R1-1721054, Nov. 27-Dec. 1, 2017, 5 pages, Reno, USA.

3rd Generation Partnership Project; Technical Specification Group Radio Access Network; NR; Physical channels and modulation (Release 15), 3GPP TS 38.211 V15.4.0 (Dec. 2018), 96 pages.

3rd Generation Partnership Project; Technical Specification Group Radio Access Network; NR; Physical layer procedures for control (Release 15), 3GPP TS 38.213 V15.4.0 (Dec. 2018), 104 pages.

3rd Generation Partnership Project; Technical Specification Group Radio Access Network; NR; Physical layer procedures for data (Release 15), 3GPP TS 38.214 V15.4.0 (Dec. 2018), 102 pages.

"RAN1 Chairman's Notes", 3GPP TSG RAN WG1 Meeting #93, Busan, Korea, May 21-25, 2018, 166 pages.

Ericsson, "PDCCH enhancements for NR URLLC", 3GPP TSG-RAN WG1 Meeting #96, Tdoc R1-1901593, Athens, Greece, Feb. 25-Mar. 1, 2019, 15 pages.

Nokia, et al., "On the PDCCH enhancements for NR URLLC", 3GPP TSG RAN WG1 Meeting #96, R1-1901950, Athens, Greece, Feb. 25-Mar. 1, 2019, 7 pages.

* cited by examiner

BLIND DETECTION METHOD AND APPARATUS

CROSS-REFERENCE TO RELATED APPLICATIONS

This application is a continuation of International Application No. PCT/CN2020/081936, filed on Mar. 28, 2020, which claims priority to Chinese Patent Application No. 201910252628.3, filed on Mar. 29, 2019 and claims priority to Chinese Patent Application No. 201910268022.9, filed on Apr. 3, 2019. All of the aforementioned patent applications are hereby incorporated by reference in their entireties.

TECHNICAL FIELD

This application relates to the field of communication technologies, and in particular, to a blind detection method and apparatus.

BACKGROUND

In a communication system, a network side device may send downlink control information (DCI) to a terminal side device on a physical downlink control channel (PDCCH). The DCI may include information such as uplink scheduling information used to schedule the terminal side device to transmit data on a physical uplink shared channel (PUSCH) or downlink scheduling information used to schedule the terminal side device to receive a physical downlink shared channel (PDSCH). The PDCCH is transmitted on a plurality of consecutive control channel elements (CCE), and a quantity of CCEs occupied by the PDCCH may be referred to as an aggregation level of the PDCCH. For example, if the PDCCH occupies four CCEs, the aggregation level of the PDCCH is 4.

The network side device may preconfigure, for the terminal side device by using higher layer signaling, a PDCCH candidate set corresponding to each piece of DCI, but does not notify the terminal side device of a specific PDCCH candidate or specific PDCCH candidates on which the DCI is to be sent. However, the terminal side device may determine, based on configuration information sent by the network side device, the DCI that is currently expected to be received. Therefore, the terminal side device may perform, based on the configuration information, blind detection on a PDCCH candidate in a PDCCH candidate set corresponding to the DCI that is currently expected to be received. The blind detection is relatively complex, and a large amount of power consumption is caused when the terminal side device performs blind detection. Therefore, an upper limit of a quantity of blind detections to be performed by the terminal side device in one slot and an upper limit of a quantity of CCEs used for channel estimation are set.

In a conventional technology, to avoid that a quantity of blind detections to be performed in one slot is greater than the upper limit of the quantity of blind detections, and to avoid that a quantity of CCEs used for channel estimation is greater than the upper limit of the quantity of CCEs, before performing blind detection on a PDCCH, the terminal side device needs to determine a quantity of blind detections to be performed on the PDCCH and a quantity of CCEs used for channel estimation on the PDCCH. The operations of determining, by the terminal side device, a quantity of blind detections to be performed on the PDCCH and a quantity of CCEs used for channel estimation consume a large amount of resources. Especially, when the terminal side device simultaneously receives a plurality of pieces of DCI, complexity of blind detection of PDCCHs by the terminal side device significantly increases.

SUMMARY

Embodiments of this application provide a blind detection method and apparatus, to resolve a problem of how to reduce complexity of blind detection of a PDCCH.

According to a first aspect, an embodiment of this application provides a blind detection method, and the method includes: A terminal side device receives first indication information from a network side device, where the first indication information is used to indicate at least one of N time units, any one of the N time units is a first time unit, the first time unit in the N time units corresponds to a type of terminal operation, the terminal operation is being prohibited from performing a first operation, a second operation, and a third operation, or is performing at least one of the first operation, the second operation, and the third operation, the N time units belong to a same transmission time unit, and any one of the N time units includes at least one symbol, where N is an integer greater than 0.

The first operation is used to determine a quantity of blind detections to be performed on a physical downlink control channel PDCCH in a current time unit, the second operation is used to determine a quantity of non-overlapping control channel elements CCEs used for channel estimation on the PDCCH in the current time unit, and the third operation is used to determine whether the quantity of blind detections to be performed on the PDCCH in the current time unit is greater than a maximum quantity of blind detections that corresponds to the current time unit, and/or is used to determine whether the quantity of non-overlapping CCEs in the current time unit is greater than a maximum quantity of CCEs that corresponds to the current time unit.

The terminal side device determines the N time units based on the first indication information, and performs the corresponding terminal operation in the first time unit in the N time units.

The network side device may indicate, by using the first indication information, that the terminal side device may perform a part of the first operation to the third operation in a time unit of a same transmission time unit at a time unit granularity, but not always perform the first operation to the third operation, or that the terminal side device may not perform the first operation to the third operation. Therefore, overheads of blind detection of the PDCCH by the terminal side device are reduced, and blind detection efficiency is improved.

According to a second aspect, an embodiment of this application provides a blind detection method, and the method includes: A terminal side device receives first indication information from a network side device, where the first indication information is used to indicate N time units and a type of each of the N time units; for a first time unit in the N time units, a type of the first time unit is used to indicate the terminal side device to perform at least one of a first operation, a second operation, and a third operation in the first time unit, or not to perform the first operation, the second operation, and the third operation; the N time units belong to a same transmission time unit, each of the N time units includes at least one symbol, and N is an integer greater than 0; and the first operation is used to determine a quantity of blind detections to be performed on a physical downlink control channel PDCCH in a current time unit, the second operation is used to determine a quantity of non-overlapping control channel elements CCEs used for channel estimation on the PDCCH in the current time unit, and the third operation is used to determine whether the quantity of blind detections to be performed on the PDCCH in the current time unit is greater than a maximum quantity of blind detections that corresponds to the current time unit, and/or is used to determine whether the quantity of non-overlapping CCEs in the current time unit is greater than a maximum quantity of CCEs that corresponds to the current time unit.

The terminal side device determines the type of each of the N time units based on the first indication information, and performs, in each time unit, an operation indicated by the type of the time unit.

The network side device may indicate the type of each time unit by using the first indication information, so that the terminal side device determines, based on the type of each time unit, to perform only a part of the first operation to the third operation in a time unit of a same transmission time unit, or not to perform the first operation to the third operation. Therefore, overheads of blind detection of the PDCCH by the terminal side device are reduced, and blind detection efficiency is improved.

In a possible implementation, the corresponding terminal operation includes the first operation, and that the terminal side device performs the first operation in the first time unit based on the first indication information includes: The terminal side device determines, based on a first preset condition, a quantity of blind detections to be performed on the PDCCH on M PDCCH candidates in the first time unit, where the M PDCCH candidates are configured by the network side device in the first time unit, and M is an integer greater than 0. If any two PDCCH candidates in the M PDCCH candidates meet the first preset condition, the two PDCCH candidates correspond to one blind detection; otherwise, the two PDCCH candidates correspond to two blind detections.

In a possible implementation, the first preset condition includes the following content:

the two PDCCH candidates correspond to a same CCE set;

the two PDCCH candidates have a same scrambling code sequence;

the two PDCCH candidates are from a same control resource set CORESET; and lengths of downlink control information DCI on which blind detection is performed by the terminal side device on the two PDCCH candidates are the same.

In a possible implementation, when the corresponding terminal operation includes the second operation, that the terminal side device performs the second operation in the first time unit based on the first indication information includes:

The terminal side device determines, based on a second preset condition and a third preset condition, a quantity of non-overlapping CCEs included in the M PDCCH candidates located in the first time unit, where the M PDCCH candidates are configured by the network side device in the first time unit, and M is an integer greater than 0; and for any two CCEs in the M PDCCH candidates, when the two CCEs are from different PDCCH candidates, if the two CCEs meet at least one of the second preset condition and the third preset condition, the two CCEs are two non-overlapping CCEs; otherwise, the two CCEs are one CCE, for example, one non-overlapping CCE.

In a possible implementation, the second preset condition is that the two CCEs are from different control resource sets CORESETs, and CORESET indexes of the CORESETs from which the two CCEs come are different. The third preset condition is that moments (for example, start symbols) at which the terminal side device performs blind detection on the PDCCH on two PDCCH candidates corresponding to the two CCEs are different.

In a possible implementation, when the corresponding terminal operation includes the third operation, that the terminal side device performs the third operation in the first time unit based on the first indication information includes:

The terminal side device performs the following operation for an $i^{th}$ search space set in P search space sets based on a priority sequence of the P search space sets configured by the network side device: The terminal side device determines whether a quantity, of blind detections, corresponding to a PDCCH candidate that is located in the first time unit and that is in a PDCCH candidate included in the first search space set to the $i^{th}$ search space set is greater than a maximum quantity of blind detections that corresponds to the first time unit, and determines, if the quantity of blind detections is greater than the maximum quantity of blind detections, not to perform blind detection on the PDCCH in the $i^{th}$ search space set, where i is an integer greater than or equal to 1 and less than or equal to P. Alternatively, the terminal side device determines whether a quantity of non-overlapping CCEs included in a PDCCH candidate that is located in the first time unit and that is in a PDCCH candidate included in the first search space set to the $i^{th}$ search space set is greater than a maximum quantity of CCEs that corresponds to the first time unit, and determines, if the quantity of non-overlapping CCEs is greater than the maximum quantity of CCEs, not to perform blind detection on the PDCCH in the $i^{th}$ search space set. Alternatively, if determining that a quantity, of blind detections, corresponding to a PDCCH candidate that is located in the first time unit and that is in a PDCCH candidate included in the first search space set to the $i^{th}$ search space set is less than or equal to a maximum quantity of blind detections that corresponds to the first time unit, and determining that a quantity of non-overlapping CCEs included in the PDCCH candidate that is located in the first time unit and that is in the PDCCH candidate included in the first search space set to the $i^{th}$ search space set is less than or equal to a maximum quantity of CCEs that corresponds to the first time unit, the terminal side device determines to perform blind detection on the PDCCH in the $i^{th}$ search space set.

The quantity of blind detections in the embodiments of this application is described in a 3GPP protocol as a quantity of PDCCH candidates monitored by the terminal side device in a span in an NR system slot, and is a quantity of to-be-monitored PDCCH candidates that is determined by the terminal side device after the terminal side device performs determining and the first operation on at least one PDCCH candidate based on the first preset condition. The maximum quantity of blind detections is described in the 3GPP protocol as a maximum quantity of PDCCH candidates monitored in a time unit (for example, an NR span) for a downlink BWP with a specific subcarrier spacing in a serving cell. The network side device may configure a search space set and a CORESET corresponding to the search space set, the search space set and the CORESET are used to determine resource locations of a plurality of CCEs, and one PDCCH candidate includes CCEs whose quantity is an aggregation level. After performing determining and the second operation on the plurality of CCEs based on the second preset condition, the terminal side device determines the quantity of non-overlapping CCEs. The maximum quantity of CCEs is described in the 3GPP protocol as a quantity of non-overlapping CCEs in a time unit (for example, an NR span) for a downlink BWP with a specific subcarrier spacing in a serving cell.

It should be noted that the determined quantity of to-be-monitored PDCCH candidates herein is not necessarily a quantity of PDCCHs that are actually monitored by the terminal side device. Similarly, the determined quantity of non-overlapping CCEs is not necessarily a quantity of CCEs actually used by the terminal side device for channel estimation in a PDCCH monitoring process. The terminal side device may finally determine, based on the third preset condition and through the third operation, the quantity of PDCCH candidates actually monitored for monitoring the PDCCH and/or the quantity of non-overlapping CCEs actually used for channel estimation.

In a possible implementation, the transmission time unit includes K common search space sets and H user equipment-specific search space sets, and both K and H are integers greater than or equal to 0 (where 0 indicates that no common search space set or no user equipment-specific search space set exists). When the corresponding terminal operation includes the third operation, that the terminal side device performs the third operation in the first time unit based on the first indication information includes:

The terminal side device performs the following operation in ascending order of search space set identifiers of the H user equipment-specific search space sets:

For a user equipment-specific search space set whose search space set identifier is j in the H user equipment-specific search space sets, the terminal side device determines whether a quantity, of blind detections, corresponding to a PDCCH candidate that is located in the first time unit and that is in a PDCCH candidate included in a user equipment-specific search space set whose search space set identifier is $j_{min}$ to a user equipment-specific search space set whose search space set identifier is j is greater than a difference between a maximum quantity of blind detections that corresponds to the first time unit and a first quantity of blind detections. If the quantity of blind detections is greater than the difference, and a quantity, of blind detections, corresponding to a PDCCH candidate that is located in the first time unit and that is in a PDCCH candidate included in the user equipment-specific search space set whose search space set identifier is $j_{min}$ in the H user equipment-specific search space sets to a user equipment-specific search space set whose search space set identifier is j' is less than the difference between the maximum quantity of blind detections that corresponds to the first time unit and the first quantity of blind detections, the terminal side device determines not to perform blind detection on the PDCCH in the user equipment-specific search space set whose search space set identifier is j and a remaining user equipment-specific search space set whose search space set identifier is greater than j in the H user equipment-specific search space sets. The first quantity of blind detections is a sum of quantities, of blind detections, corresponding to PDCCH candidates located in the first time unit that are in PDCCH candidates included in the K common search space sets, where j' is less than j, and j' is a search space set identifier that has a smallest difference from j in H search space set identifiers corresponding to the H user equipment-specific search space sets. Optionally, for a user equipment-specific search space set, j is an integer greater than or equal to 1 and less than or equal to 39, and $j_{min}$ is a smallest search space set identifier in the H user equipment-specific search space sets. For example, a network side device configures user equipment-specific search space sets for the terminal, and search space set identifiers of the user-specific search space sets are obtained as 2, 3, 5, 7, and 9 after the identifiers are sorted in ascending order of the identifiers. If a value of j is 7, a search space set identifier that is less than 7 and that has a smallest difference from 7 is 5. Therefore, a value of j' is 5.

In addition/alternatively, the terminal side device determines whether a quantity of non-overlapping CCEs included in a PDCCH candidate that is located in the first time unit and that is in a PDCCH candidate included in a user equipment-specific search space set whose search space set identifier is $k_{min}$ to a user equipment-specific search space set whose search space set identifier is k is greater than a difference between a maximum quantity of CCEs that corresponds to the first time unit and a first quantity of CCEs. If the quantity of non-overlapping CCEs is greater than the difference, and a quantity of non-overlapping CCEs included in a PDCCH candidate that is located in the first time unit and that is in a PDCCH candidate included in the user equipment-specific search space set whose search space set identifier is $k_{min}$ in the H user equipment-specific search space sets to a user equipment-specific search space set whose search space set identifier is k' is less than the difference between the maximum quantity of CCEs that corresponds to the first time unit and the first quantity of CCEs, the terminal side device determines not to perform blind detection on the PDCCH in the user equipment-specific search space set whose search space set identifier is k and a remaining user equipment-specific search space set whose search space set identifier is greater than k in the H user equipment-specific search space sets, where the first quantity of CCEs is a sum of quantities of non-overlapping CCEs included in PDCCH candidates located in the first time unit that are in PDCCH candidates included in the K common search space sets, k' is less than k, and k' is a search space set identifier that has a smallest difference from k in H search space set identifiers corresponding to the H user equipment-specific search space sets. For example, the network configures user-specific search space sets for the terminal, and search space set identifiers of the user-specific search space sets are obtained as 2, 3, 5, 7, and 9 after the identifiers are sorted in ascending order of the identifiers. If a value of k is 7, a search space set identifier that is less than 7 and that has a smallest difference from 7 is 5. Therefore, a value of k' is 5.

In addition/alternatively, for the user equipment-specific search space set whose search space set identifier is j in the H user equipment-specific search space sets, if determining that the quantity, of blind detections, corresponding to the PDCCH candidate that is located in the first time unit and that is in the PDCCH candidate included in the user equipment-specific search space set whose search space set identifier is $j_{min}$ to the user equipment-specific search space set whose search space set identifier is j is less than the difference between the maximum quantity of blind detections that corresponds to the first time unit and the first quantity of blind detections, and determining that a quantity of non-overlapping CCEs included in the PDCCH candidate located in the first time unit is less than the difference between the maximum quantity of CCEs that corresponds to the first time unit and the first quantity of CCEs, the terminal side device determines to perform blind detection on the PDCCH in the user equipment-specific search space set whose search space set identifier is j.

In a possible implementation, the first indication information includes L bits, and at least one bit in the L bits uniquely corresponds to the first time unit in the N time units, where L is an integer greater than or equal to N.

Different bit status values of the at least one bit corresponding to the first time unit indicate the corresponding terminal operation of the terminal side device in the first time unit.

In a possible implementation, the first indication information is an index value, and a pattern corresponding to the index value indicates locations of the N time units in the transmission time unit, and indicates the corresponding terminal operation in the first time unit.

According to a third aspect, an embodiment of this application provides a blind detection method, including: A network side device determines first indication information, where the first indication information is used to indicate at least one of N time units, any one of the N time units is a first time unit, the first time unit in the N time units corresponds to a type of terminal operation, the terminal operation is being prohibited from performing a first operation, a second operation, and a third operation, or is performing at least one of the first operation, the second operation, and the third operation, the N time units belong to a same transmission time unit, and any one of the N time units includes at least one symbol, where N is an integer greater than 0; and the first operation is used to determine a quantity of blind detections to be performed on a physical downlink control channel PDCCH in a current time unit, the second operation is used to determine a quantity of non-overlapping control channel elements CCEs used for channel estimation on the PDCCH in the current time unit, and the third operation is used to determine whether the quantity of blind detections to be performed on the PDCCH in the current time unit is greater than a maximum quantity of blind detections that corresponds to the current time unit, and/or is used to determine whether the quantity of non-overlapping CCEs in the current time unit is greater than a maximum quantity of CCEs that corresponds to the current time unit. The network side device sends the first indication information to the terminal side device.

The network side device may indicate a type of each time unit by using the first indication information, so that the terminal side device determines, based on the type of each time unit, to perform only a part of the first operation to the third operation in a time unit, or not to perform the first operation to the third operation. Therefore, overheads of blind detection of the PDCCH by the terminal side device are reduced, and blind detection efficiency is improved.

In this embodiment of this application, that the terminal side device does not perform the first operation to the third operation or is prohibited from performing the first operation to the third operation indicates that the terminal side device does not perform the first operation to the third operation in the first time unit (for example, an NR span). That the terminal side device performs only a part of the first operation to the third operation in a time unit (an NR span) indicates that the terminal side device performs a part or all of the first operation, the second operation, and the third operation on a PDCCH configuration in the time unit. If a configuration of the network side device causes a quantity of PDCCH candidates that corresponds to a user-specific search space set in a time unit to exceed a difference between a maximum quantity of to-be-monitored PDCCH candidates that corresponds to the time unit and a quantity that is of to-be-monitored PDCCH candidates and that corresponds to a common search space set in the time unit, the terminal side device performs the first operation, the second operation, and the third operation in the time unit. Alternatively, if a configuration of the network side device causes a quantity of non-overlapping CCEs that corresponds to a user-specific search space set in a time unit to exceed a difference between a maximum quantity of non-overlapping CCEs that corresponds to the time unit and a quantity of non-overlapping CCEs that corresponds to a common search space set in the time unit, the terminal side device performs the first operation, the second operation, and the third operation in the time unit.

In the foregoing case, the quantity of to-be-monitored PDCCH candidates or the quantity of non-overlapping CCEs in the time unit exceeds an implementation capability of the terminal side device, and the terminal side device limits, through the third operation, a quantity of PDCCH candidates actually monitored or a quantity of non-overlapping CCEs in the time unit to a range that can be actually processed by the terminal side device. If the terminal side device does not perform the first operation, the second operation, and the third operation in a time unit, or performs the first operation and the second operation but does not perform the third operation in the time unit, it indicates that a quantity of PDCCH candidates that need to be monitored or a quantity of non-overlapping CCEs in the time unit does not exceed a capability that can be processed by the terminal side device, in other words, does not exceed a limit of that is a maximum quantity of PDCCH candidates to be monitored or a maximum quantity of non-overlapping CCEs and that corresponds to the time unit. In this case, for the time unit, the terminal side device does not perform the first operation, the second operation, and the third operation, or performs the first operation and the second operation but does not perform the third operation.

For a time unit, a part of the first operation, the second operation, and the third operation may be performed or the first operation, the second operation, and the third operation may be skipped in the time unit or in any time unit in a transmission time unit before a transmission time unit in which the time unit is located. For example, if the terminal side device needs to perform the first operation, the second operation, and the third operation for the 1$^{st}$ time unit (for example, an NR span 1) in a transmission time unit 5 (for example, an NR slot 5), the operations may be performed in a transmission time unit 4 (for example, an NR slot 4), any time unit in the transmission time unit 4, a transmission time unit 3, or any time unit in the transmission time unit 3.

In a possible implementation, the first indication information includes L bits, and at least one bit in the L bits uniquely corresponds to the first time unit in the N time units, where L is an integer greater than or equal to N.

Different bit status values of the at least one bit corresponding to the first time unit indicate the corresponding terminal operation of the terminal side device in the first time unit.

In a possible implementation, the first indication information is an index value, and a pattern corresponding to the index value indicates locations of the N time units in the transmission time unit, and indicates the corresponding terminal operation in the first time unit.

According to a fourth aspect, this application provides an apparatus. The apparatus has a function of implementing the terminal side device in the first aspect to the third aspect. For example, the apparatus includes a module, unit, or means corresponding to a step performed by the terminal side device in the first aspect to the third aspect. The function, the unit, or the means may be implemented by software, or may be implemented by hardware, or may be implemented by hardware executing corresponding software.

In a possible design, the apparatus includes a processing unit and a transceiver unit. Functions performed by the processing unit and the transceiver unit may correspond to the steps performed by the terminal side device in the first aspect to the third aspect.

In a possible design, the apparatus includes a processor, and may further include a transceiver. The transceiver is configured to receive and send a signal, and the processor executes program instructions, to complete the method performed by the terminal side device according to any one of the possible designs or implementations in the first aspect to the third aspect.

The apparatus may further include one or more memories, and the memory is configured to be coupled to the processor. The one or more memories may be integrated with the processor, or may be separate from the processor. This is not limited in this application.

In a possible manner, the memory stores computer program instructions and/or data required for implementing the functions of the terminal side device in the first aspect to the third aspect. The processor may execute the computer program instructions stored in the memory, to complete the method performed by the terminal side device according to any one of the possible designs or implementations in the first aspect to the third aspect.

According to a fifth aspect, this application provides an apparatus. The apparatus has a function of implementing the network side device in the first aspect to the third aspect. For example, the apparatus includes a module, unit, or means corresponding to a step performed by the network side device in the first aspect to the third aspect. The function, the unit, or the means may be implemented by software, or may be implemented by hardware, or may be implemented by hardware executing corresponding software.

In a possible design, the apparatus includes a processing unit and a transceiver unit. Functions performed by the processing unit and the transceiver unit may correspond to the steps performed by the network side device according to any one of the possible designs or implementations in the first aspect to the third aspect.

In another possible design, the communication apparatus includes a processor, and may further include a transceiver. The transceiver is configured to receive and send a signal, and the processor executes program instructions, to complete the method performed by the network side device according to any one of the possible designs or implementations in the first aspect to the third aspect.

The apparatus may further include one or more memories, and the memory is configured to be coupled to the processor. The one or more memories may be integrated with the processor, or may be separate from the processor. This is not limited in this application.

In a possible manner, the memory stores computer program instructions and/or data required for implementing the functions of the network side device according to any one of the possible designs or implementations in the first aspect to the third aspect. The processor may execute the computer program instructions stored in the memory, to complete the method performed by the network side device according to any one of the possible designs or implementations in the first aspect to the third aspect.

An embodiment of this application provides a computer-readable storage medium. The computer storage medium stores computer-readable instructions. When a computer reads and executes the computer-readable instructions, the computer is enabled to perform the method according to any one of the foregoing possible designs.

An embodiment of this application provides a computer program product. When a computer reads and executes the computer program product, the computer is enabled to perform the method according to any one of the foregoing possible designs.

An embodiment of this application provides a chip. The chip is configured to read and execute a software program stored in a memory, to implement the method according to any one of the foregoing possible designs. The memory is connected to the chip, or the memory is built in the chip.

DETAILED DESCRIPTION OF ILLUSTRATIVE EMBODIMENTS

The following describes embodiments of this application in detail with reference to the accompanying drawings of this specification.

The embodiments of this application may be applied to various mobile communication systems, for example, a new radio (NR) system, a long term evolution (LTE) system, a long term evolution-advanced (LTE-A) system, an evolved long term evolution (eLTE) system, a future communication system, and another communication system. Specifically, this is not limited herein.

Figure 1:
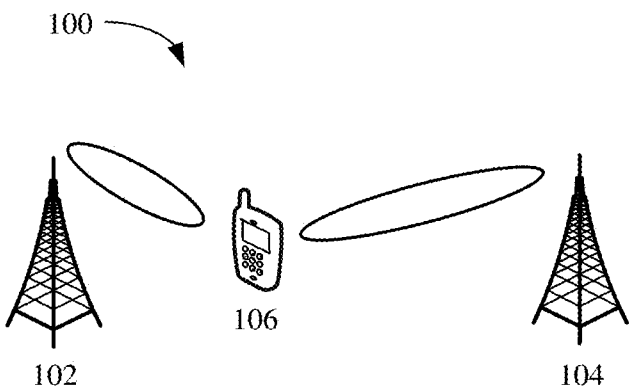
FIG. 1 is a schematic diagram of a communication system to which a communication method according to an embodiment of this application is applicable.

For ease of understanding of the embodiments of this application, a communication system shown in FIG. 1 is first used as an example to describe in detail a communication system to which the embodiments of this application are applicable. FIG. 1 is a schematic diagram of a communication system to which a communication method according to an embodiment of this application is applicable. As shown in FIG. 1, the communication system 100 includes a network side device 102 and a terminal side device 106. A plurality of antennas may be configured for the network side device 102, and a plurality of antennas may also be configured for the terminal side device 106.

In the embodiments of this application, the terminal side device is a device having a wireless transceiver function or a chip that can be disposed in the device. The device having the wireless transceiver function may also be referred to as user equipment (UE), an access terminal, a subscriber unit, a subscriber station, a mobile station, a remote station, a remote terminal, a mobile device, a user terminal, a user agent, or a user apparatus. In an actual application, the terminal side device in the embodiments of this application may be a mobile phone, a tablet computer (Pad), a computer having a wireless transceiver function, a virtual reality (VR) terminal, an augmented reality (AR) terminal, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. An application scenario is not limited in the embodiments of this application. In this application, the device having the wireless transceiver function and the chip that can be disposed in the device are collectively referred to as the terminal side device.

In the embodiments of this application, the network side device may be a radio access device in various standards, for example, an evolved NodeB (eNB), a NodeB (Node B, NB), a home base station (for example, a home evolved NodeB, or a home Node B, HNB), a baseband unit (BBU), an access point (AP) in a wireless fidelity (Wi-Fi) system, a wireless relay node, a wireless backhaul node, a transmission and reception point (TRP) or a transmission point (TP). The network side device may alternatively be a gNB, a TRP or TP) in a 5G (NR) system, one antenna panel or a group of antenna panels (including a plurality of antenna panels) of a base station in a 5G system, a network node, for example, a baseband unit (BBU), that constitutes a gNB or a transmission point, a DU in a central-distributed (CU-DU) architecture, or the like.

A network architecture and a service scenario described in the embodiments of this application are intended to describe technical solutions in the embodiments of this application more clearly, and do not constitute a limitation on the technical solutions provided in the embodiments of this application. A person of ordinary skill in the art may know that: With evolution of the network architecture and emergence of new service scenarios, the technical solutions provided in the embodiments of this application are also applicable to similar technical problems.

Figure 2:
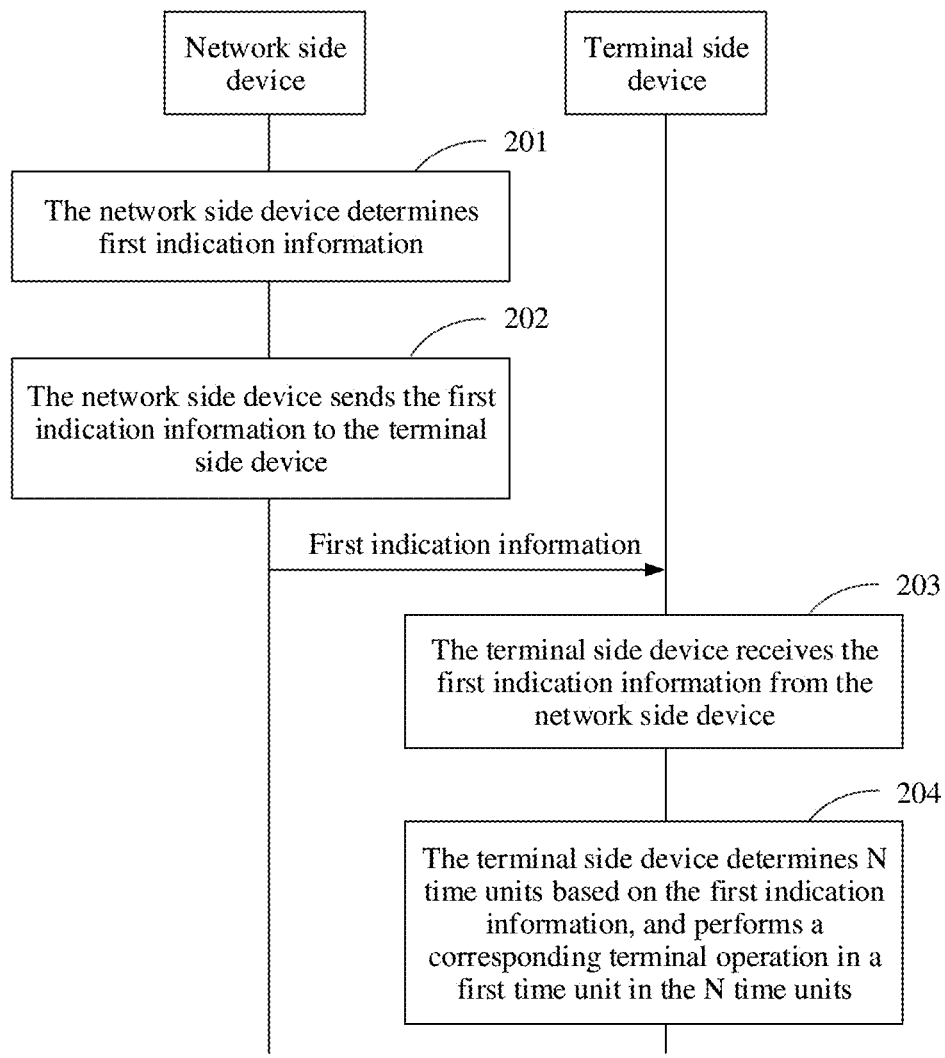
FIG. 2 is a schematic flowchart of a blind detection method according to an embodiment of this application.

FIG. 2 is a schematic flowchart of a blind detection method according to an embodiment of this application. The method includes the following steps.

Step 201: A network side device determines first indication information.

In this embodiment of this application, the first indication information may explicitly indicate an operation to be performed by a terminal side device in each time unit. In this case, the first indication information is used to indicate at least one time unit in N time units (for example, all the N time units), where any one of the N time units is a first time unit, the first time unit in the N time units corresponds to a type of terminal operation, and the terminal operation is being prohibited from performing a first operation, a second operation, and a third operation, or is performing at least one of the first operation, the second operation, and the third operation. The N time units belong to a same transmission time unit, any one of the N time units includes at least one symbol, and N is an integer greater than 0. The first operation is used to determine a quantity of blind detections to be performed on a physical downlink control channel PDCCH in a current time unit, the second operation is used to determine a quantity of non-overlapping control channel elements CCEs used for channel estimation on the PDCCH in the current time unit, and the third operation is used to determine whether the quantity of blind detections to be performed on the PDCCH in the current time unit is greater than a maximum quantity of blind detections that corresponds to the current time unit, and/or is used to determine whether the quantity of non-overlapping CCEs in the current time unit is greater than a maximum quantity of CCEs that corresponds to the current time unit.

In this embodiment of this application, the first indication information may alternatively implicitly indicate an operation to be performed by a terminal side device in each time unit. In this case, the first indication information is used to indicate N time units and a type of each of the N time units. For a first time unit in the N time units, a type of the first time unit is used to indicate the terminal side device to perform at least one of a first operation, a second operation, and a third operation in the first time unit, or is used to indicate the terminal side device not to perform the first operation, the second operation, and the third operation. The first time unit is any one of the N time units.

It should be noted that a quantity of time units indicated by the first indication information may be greater than N. However, operations to be performed by the terminal side device in only N time units of the time units are indicated, and an operation to be performed in another time unit is not indicated. In this case, according to a method in a conventional technology, the terminal side device may perform blind detection in a time unit, where an operation to be performed in the time unit is not indicated.

Step 202: The network side device sends the first indication information to the terminal side device.

Step 203: The terminal side device receives the first indication information from the network side device.

Step 204: The terminal side device determines the N time units based on the first indication information, and performs the corresponding terminal operation in the first time unit in the N time units.

In the foregoing method, the terminal side device is indicated by using the first indication information to perform at least one of the first operation, the second operation, and the third operation in any time unit in the same transmission time unit, or not to perform the first operation, the second operation, and the third operation in any time unit in the same transmission time unit. The terminal side device performs at least one of the foregoing three operations based on different time units (for example, spans) included in the same transmission time unit (for example, a slot in NR). On the one hand, an operation is not performed based on the entire transmission time unit; on the other hand, not all the foregoing three operations need to be performed in all the time units included in the same transmission time unit (but at least one of the foregoing three operations may be performed in a part of the time units). Therefore, resource consumption caused when the terminal side device determines the quantity of blind detections to be performed on the PDCCH and determines the quantity of CCEs used for channel estimation on the PDCCH may be reduced, and complexity of blind detection performed by the terminal side device may be reduced.

Figure 3:
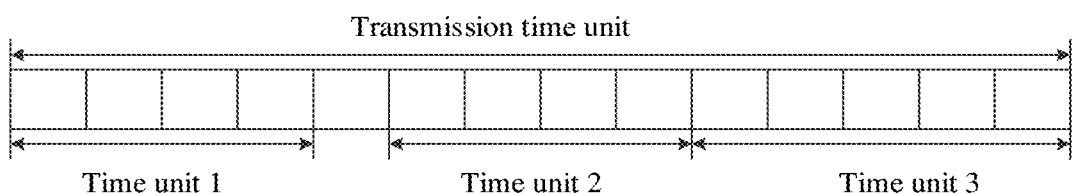
FIG. 3 is a schematic diagram of a transmission time unit according to an embodiment of this application.

In this embodiment of this application, the network side device may divide one transmission time unit into a plurality of time units, and each time unit includes at least one symbol. The transmission time unit may be a slot in an NR system, a subframe in an LTE system, or the like. The time unit described in this embodiment of this application may be a span described in a current protocol, or may be a combination of at least two spans that is described in a protocol, or may be another type of time unit or the like. The symbol may be an orthogonal frequency division multiplexing (OFDM) symbol, or may be another type of symbol. Details are not described herein. For example, as shown in FIG. 3, one transmission time unit includes 14 symbols, and the network side device divides the transmission time unit into three time units: a time unit 1, a time unit 2, and a time unit 3.

It should be noted that the span is a time unit stipulated in the current protocol, and a length of each span is at least Y consecutive OFDM symbols, where Y is an integer greater than 0. For example, the network side device may indicate, by using higher layer signaling (for example, radio resource control signaling), whether the terminal side device supports a case in which a time interval between start symbols of two spans is at least X consecutive OFDM symbols. The terminal side device has at least one PDCCH monitoring occasion in each of the two spans, and at least one of the PDCCH monitoring occasions is not a monitoring occasion in a downlink basic capability. Possible combinations of X and Y are (X, Y)=(7, 3), (X, Y)={(4, 3), (7, 3)}, or (X, Y)={(2, 2), (4, 3), (7, 3)}.

Currently, for any time unit in a transmission time unit, the terminal side device needs to perform a zeroth operation to the third operation in the time unit:

Zeroth operation: Calculate, according to a method in an existing protocol, a location of a CCE included in a PDCCH candidate that is located in the current time unit and that is in all PDCCH candidates included in each monitored search space set.

First operation: Determine the quantity of blind detections to be performed on the PDCCH in the current time unit.

The terminal side device may perform one blind detection on one PDCCH candidate. If two PDCCH candidates meet a first preset condition, the terminal side device needs to perform only one blind detection on the two PDCCH candidates. Therefore, to improve blind detection efficiency, the terminal side device may first determine a quantity of PDCCH candidates that meet the first preset condition, to determine the quantity of blind detections.

If the current time unit includes a plurality of PDCCH candidates, for any two of the PDCCH candidates, when the two PDCCH candidates meet the first preset condition, the two PDCCH candidates correspond to one blind detection, and the terminal side device performs one blind detection on the two PDCCH candidates; when the two PDCCH candidates do not meet the first preset condition, the two PDCCH candidates correspond to two blind detections, and the terminal side device performs two blind detections on the two PDCCH candidates. The first preset condition includes the following content: the two PDCCH candidates correspond to a same CCE set, that is, the two PDCCH candidates have a same aggregation level, and CCEs included in the two PDCCH candidates have a same start CCE location; the two PDCCH candidates have a same scrambling code sequence; the two PDCCH candidates are from a same control resource set (CORESET); and lengths of DCI on which blind detection is performed by the terminal side device on the two PDCCH candidates are the same.

With reference to the foregoing descriptions, if the first indication information indicates the N time units, for the first time unit in the N time units, when the terminal side device determines, based on the first indication information, to perform the first operation in the first time unit, the terminal side device may determine, based on the first preset condition, a quantity of blind detections to be performed on the PDCCH on M PDCCH candidates in the first time unit, where the first time unit is any time unit in the N time units, the M PDCCH candidates are configured by the network side device in the first time unit, and M is an integer greater than 0. The terminal side device may determine, by performing the zeroth operation, the M PDCCH candidates included in the first time unit and a location of a CCE included in each PDCCH candidate. For a specific process, refer to a conventional technology, and details are not described herein.

Second operation: Determine the quantity of non-overlapping CCEs used for channel estimation on the PDCCH in the current time unit.

Because CCEs included in different PDCCH candidates may overlap, a CCE in only one of the PDCCH candidates may be used for channel estimation during the channel estimation. In this way, the terminal side device may determine the quantity of non-overlapping CCEs before performing channel estimation, to improve efficiency of the channel estimation.

For any two CCEs, when the two CCEs are from different PDCCH candidates, if the two CCEs meet at least one of a second preset condition and a third preset condition, the two CCEs are two non-overlapping CCEs; otherwise, the two CCEs are one CCE, for example, one non-overlapping CCE.

The second preset condition is that the two CCEs are from different CORESETs, and the third preset condition is that moments at which the terminal side device performs blind detection on the PDCCH on two PDCCH candidates corresponding to the two CCEs are different.

With reference to the foregoing descriptions, if the first indication information indicates the N time units, for the first time unit in the N time units, when the terminal side device determines, based on the first indication information, to perform the second operation in the first time unit, the terminal side device may determine, based on the second preset condition and the third preset condition, a quantity of non-overlapping CCEs included in the M PDCCH candidates in the first time unit, where the first time unit is any time unit in the N time units.

Third operation: Determine whether the quantity of blind detections to be performed on the PDCCH in the current time unit is greater than the maximum quantity of blind detections that corresponds to the current time unit, and/or determine whether the quantity of non-overlapping CCEs in the current time unit is greater than the maximum quantity of CCEs that corresponds to the current time unit.

A PDCCH candidate set of one PDCCH may be referred to as a search space set, and the search space set may be classified into a common search space set (CSS set) and a user equipment-specific search space set (USS set). A priority of the CSS set is higher, and a priority of the USS set is lower than that of the CSS set.

The network side device configures that a quantity of blind detections that corresponds to the CSS set and a quantity that is of non-overlapping CCEs used for channel estimation and that corresponds to the CSS set do not exceed a maximum quantity of blind detections that corresponds to one NR slot and a maximum quantity of CCEs that corresponds to one NR slot, so that it is ensured that UE does not drop any CSS set after performing the first operation, the second operation, and the third operation on all CSS sets configured in one slot. That is, the UE performs blind detection on a corresponding PDCCH on all the CSS sets configured by the network side device in one slot and performs channel estimation on corresponding non-overlapping CCEs. Only the USS set may be dropped after the first operation, the second operation, and the third operation are performed. That is, the UE may not perform blind detection on one or more USS sets and may not perform channel estimation on a corresponding non-overlapping CCE.

If the first indication information indicates the N time units, for the first time unit in the N time units, when the terminal side device determines, based on the first indication information, to perform the third operation in the first time unit, for an $i^{th}$ search space set in P search space sets, the terminal side device determines, based on a priority sequence of the P search space sets configured by the network side device, whether a quantity of blind detections that corresponds to a PDCCH candidate included in the $i^{th}$ search space set is greater than a maximum quantity of blind detections that corresponds to the first time unit, where the first time unit is any time unit in the N time units, and i is an integer greater than or equal to 1 and less than or equal to P.

If it is determined that a quantity, of blind detections, corresponding to a PDCCH candidate that is located in the time unit and that is in a PDCCH candidate included in the first search space set to the $i^{th}$ search space set is greater than the maximum quantity of blind detections that corresponds to the time unit, when the $i^{th}$ search space set is a user equipment-specific search space set, it is determined not to perform blind detection on the PDCCH in the $i^{th}$ search space set. Alternatively, if the terminal side device determines that a quantity of non-overlapping CCEs included in the PDCCH candidate that is located in the time unit and that is in the PDCCH candidate included in the first search space set to the $i^{th}$ search space set is greater than a maximum quantity of CCEs that corresponds to the time unit, when the $i^{th}$ search space set is a user equipment-specific search space set, the terminal side device determines not to perform blind detection on the PDCCH in the $i^{th}$ search space set.

When the terminal side device determines that a sum of quantities of blind detections on all the PDCCH candidates in the current time unit is greater than the maximum quantity of blind detections that corresponds to the current time unit, the terminal side device may delete a USS with a lowest priority, that is, the terminal side device does not perform, in the current time unit, blind detection on a PDCCH candidate included in the USS.

Alternatively, when the terminal side device determines that the quantity of non-overlapping CCEs used for channel estimation in the current time unit is greater than the maximum quantity of CCEs that corresponds to the current time unit, the terminal side device may delete a USS set with a lowest priority, that is, the terminal side device does not perform, in the current time unit, channel estimation by using a CCE included in a PDCCH candidate included in the USS set. Therefore, the terminal side device does not perform blind detection on the PDCCH candidate included in the USS.

It should be noted that the terminal side device needs to perform blind detection on a PDCCH candidate included in the CSS set. A quantity of blind detections that is determined by performing the second operation on PDCCH candidates configured by the network side device for one terminal side device that are of all CSS sets in one time unit does not exceed a maximum quantity of blind detections in the time unit, and a quantity of non-overlapping CCEs that is determined by performing the third operation on PDCCH candidates configured by the network side device for one terminal side device that are of all CSS sets in one time unit does not exceed a maximum quantity of CCEs in the time unit.

When the terminal side device performs the third operation, a sequence of performing determining on USS sets may have the following possibilities:

Perform determining in ascending order of USS set indexes. That is, if a USS set index is the smallest, it is first determined whether a quantity of blind detections that corresponds to a PDCCH candidate included in the USS set is greater than the maximum quantity of blind detections that corresponds to the current time unit, and whether a quantity of non-overlapping CCEs included in the PDCCH candidate included in the USS set is greater than the maximum quantity of CCEs that corresponds to the current time unit.

A priority of a USS set for non-slot-based scheduling is higher than that of a USS set for slot-based scheduling, and determining is first performed on the USS set for non-slot-based scheduling. Determining is first performed on a USS set with a largest quantity of monitoring occasions in all USS sets for non-slot-based scheduling, that is, determining is preferentially performed on a USS set with a largest quantity of "1" in monitoringSymbolsWithinSlot in a higher layer parameter searchSpace IE, or all bits of a monitoringSymbolsWithinSlot sequence are summed up, and determining is preferentially performed on a USS set corresponding to a largest summation result.

Determining is preferentially performed on a USS set in which high-priority DCI is scheduled and that is in USS sets.

With reference to the foregoing descriptions, for example, the network side device configures four search space sets for the terminal side device, the four search space sets are a CSS #0, a CSS #1, a USS #1, and a USS #2, the CSS #0 and the CSS #1 are common search space sets, and the USS #1 and the USS #2 are user equipment-specific search space sets. The CSS #0 and the CSS #1 are bound to a CORESET #0, and the CORESET #0 occupies two symbols in time domain and 24 RBs in frequency domain. The USS #1 is bound to a CORESET #1, and the CORESET #1 occupies three symbols and 12 RBs in frequency domain. The USS #2 is bound to a CORESET #2, and the CORESET #2 occupies one symbol in time domain and 16 CCEs in frequency domain.

The terminal side device first performs step 1:

For the CSS #0, it is determined through the zeroth operation and the first operation that a quantity of blind detections on a PDCCH candidate in the CSS #0 is 14. It is determined through the second operation that the PDCCH candidate in the CSS #0 includes 16 non-overlapping CCEs. The CSS #0 occupies eight CCEs on a symbol #0, and occupies eight CCEs on s symbol #7. Because the CSS #0 and the CSS #1 include different monitoring occasions, even though both the CSS #0 and the CSS #1 are bound to the CORESET #0, 8+8=16 non-overlapping CCEs are still counted.

For the CSS #1, it is determined through the zeroth operation and the first operation that a quantity of blind detections on a PDCCH candidate in the CSS #1 is 2. It is determined through the second operation that the PDCCH candidate in the CSS #1 includes 16 non-overlapping CCEs. The CSS #1 occupies eight CCEs on the symbol #0, the monitoring occasion of the CSS #1 is on the same symbol #0 as the monitoring occasion of the CSS #0, both the CSS #1 and the CSS #0 are bound to the CORESET #0, and time-frequency resources corresponding to the CSS #1 and the CSS #0 completely overlap. Therefore, a quantity of non-overlapping CCEs occupied by the CSS #1 is counted into the CSS #0, and the CSS #1 occupies zero CCEs.

A sum of the quantities, of blind detections, respectively corresponding to the CSS #0 and the CSS #1 is 14+2=16, and a sum of the quantities of non-overlapping CCEs that are occupied is 16. Assuming that the maximum quantity of blind detections is 44 and the maximum quantity of CCEs is 56, upper limits for performing determining on the USS #1 and the USS #2 are obtained by subtracting the sum of the quantities of blind detections occupied by the CSS #0 and the CSS #1 from the maximum quantity of blind detections and subtracting the sum of the quantities of non-overlapping CCEs occupied by the CSS #0 and the CSS #1 from the maximum quantity of CCEs. That is, maximum quantities of blind detections in the USS #1 and the USS #2 are 44−16=28, and maximum quantities of CCEs are 56−16=40.

Then, the terminal side device performs step 2:

For the USS #1, it is determined through the zeroth operation and the first operation that a quantity of blind detections on a PDCCH candidate in the USS #1 is 16. It is determined through the second operation that the PDCCH candidate in the USS #1 occupies 12 non-overlapping CCEs. The USS #1 occupies 12 CCEs on a symbol #0. The monitoring occasions of both the CSS #0 and the CSS #1 are on the symbol #0, but the USS #1 is bound to the CORESET #1 that is different from the CORESET #0. Therefore, 12 non-overlapping CCEs are separately counted.

It is determined through the third operation that the quantity of blind detections that corresponds to the USS #1 is less than 28, and a quantity of non-overlapping CCEs that corresponds to the USS #1 is less than 40. Therefore, the quantity of blind detections occupied by the USS #1 and the quantity of non-overlapping CCEs are respectively removed from the foregoing upper limits for determining. That is, a maximum quantity of blind detections of the USS #2 is 28-16=12, and a maximum quantity of CCEs is 40-12=28.

For the USS #2, it is determined through the zeroth operation and the first operation that a quantity of blind detections on a PDCCH candidate in the USS #2 is 3*7=21. It is determined through the second operation that the PDCCH candidate in the USS #2 occupies 16*7=102 non-overlapping CCEs.

It is determined through the third operation that the quantity of blind detections that corresponds to the USS #2 is greater than 12, and a quantity of non-overlapping CCEs that corresponds to the USS #2 is greater than 28. Therefore, a configuration of the USS #2 is deleted, and only the CSS #0, the CSS #1, and the USS #1 are monitored. That is, blind detection is performed on the PDCCH only in the CSS #0, the CSS #1, and the USS #1.

In this embodiment of this application, the network side device may configure, for the terminal side device, a PDCCH candidate included in each time unit, a maximum quantity of blind detections that corresponds to each time unit, and a maximum quantity of CCEs that corresponds to each time unit. A quantity of non-overlapping CCEs used for channel estimation in a conventional technology may continue to be used as the maximum quantity of CCEs. In the conventional technology, a maximum quantity of blind detections and a maximum quantity of CCEs in one NR slot are defined, and the terminal side device always performs the four operations, namely, the zeroth operation, the first operation, the second operation, and the third operation at an NR slot granularity. In this embodiment of this application, the terminal side device performs at least one of the first operation, the second operation, and the third operation at a granularity of the time unit (for example, two spans) included in the same transmission time unit (for example, one NR slot), or does not perform the three operations. Optionally, a length of a time unit included in a transmission time unit may be equal to a length of the transmission time unit. On the basis of performing the zeroth operation, the terminal side device may further perform a part of the first operation, the second operation, and the third operation based on an indication of the network side device, but not always perform all the three operations at a granularity of the transmission time unit. Optionally, a length of a time unit included in a transmission time unit does not exceed a length of the transmission time unit. On the basis of performing the zeroth operation, the terminal side device may further perform a part of the first operation, the second operation, and the third operation based on an indication of the network side device, but not always perform all the three operations at a granularity of the time unit included in the transmission time unit. A quantity of time units included in one transmission time unit may be predefined in a protocol, or configured by the network side device for the terminal side device by using higher layer signaling. For example, an NR slot including 14 OFDM symbols may include two time units whose lengths are both seven OFDM symbols, or two time units whose lengths are respectively six OFDM symbols and eight OFDM symbols; or may include one time unit whose length is 14 OFDM symbols, or 14 time units whose lengths are all one OFDM symbol.

In a possible implementation, different time units may correspond to a same maximum quantity of blind detections and a same maximum quantity of CCEs, or may correspond to different maximum quantities of blind detections and different maximum quantities of CCEs. For example, using an example in which the transmission time unit is an NR slot, in one slot, a maximum quantity of blind detections is B, and a maximum quantity of CCEs is C. One slot may be divided into four time units, which are respectively time units A1, A2, A3, and A4. A maximum quantity of blind detections that corresponds to the time unit A1 is B1, and a maximum quantity of CCEs that corresponds to the time unit A1 is C1. Similarly, a maximum quantity of blind detections that corresponds to the time unit A2 is B2, and a maximum quantity of CCEs that corresponds to the time unit A2 is C2; a maximum quantity of blind detections that corresponds to the time unit A3 is B3, and a maximum quantity of CCEs that corresponds to the time unit A3 is C3; a maximum quantity of blind detections that corresponds to the time unit A4 is B4, and a maximum quantity of CCEs that corresponds to the time unit A4 is C4. Optionally, B1 is equal to B2, B3, and B4, or a relationship among B1, B2, B3, and B4 is not limited. Optionally, C1 is equal to C2, C3, and C4, and a sum of C1, C2, C3, and C4 is less than or equal to C. Optionally, a relationship among C1, C2, C3, and C4 is not limited, and a sum of C1, C2, C3, and C4 is less than or equal to C.

In a possible implementation, a sum of maximum quantities, of blind detections, that correspond to different time units is less than or equal to a maximum quantity of blind detections that corresponds to one slot, and a sum of maximum quantities, of CCEs, that correspond to different time units is less than or equal to a maximum quantity of CCEs that corresponds to one slot. For example, in one slot, a maximum quantity of blind detections is B, and a maximum quantity of CCEs is C. One slot is divided into four time units, which are respectively A1, A2, A3, and A4. A maximum quantity of blind detections that corresponds to the time unit A1 is B1, and a maximum quantity of CCEs that corresponds to the time unit A1 is C1. Similarly, a maximum quantity of blind detections that corresponds to the time unit A2 is B2, and a maximum quantity of CCEs that corresponds to the time unit A2 is C2; a maximum quantity of blind detections that corresponds to the time unit A3 is B3, and a maximum quantity of CCEs that corresponds to the time unit A3 is C3; a maximum quantity of blind detections that corresponds to the time unit A4 is B4, and a maximum quantity of CCEs that corresponds to the time unit A4 is C4. A sum of B1, B2, B3, and B4 is less than or equal to B, and a sum of C1, C2, C3, and C4 is less than or equal to C.

Alternatively, a sum of a maximum quantity B1 or Bi ($i \geq 1$) of blind detections that corresponds to one or more (including two) time units in which the UE performs the first operation, the second operation, and the third operation is less than or equal to B, and a sum of a maximum quantity C1 or Ci ($i \geq 1$) of CCEs that corresponds to the one or more time units in which the terminal side device performs the first operation, the second operation, and the third operation is less than or equal to C. For example, in one slot, a maximum quantity of blind detections is B, and a maximum quantity of CCEs is C. One slot is divided into four time units, which are respectively a time unit A1, a time unit A2, a time unit A3, and a time unit A4. The network side device indicates the UE to perform the first operation, the second operation, and the third operation in the time unit A1 and the time unit A3, and perform at least one of the first operation, the second operation, and the third operation instead of all the operations in the time unit A2 and the time unit A4. A sum of B1 and B3 is less than or equal to B, and a sum of C1 and C3 is less than or equal to C.

B1, B2, B3, B4, C1, C2, C3, C4, B, and C may be fixed values in a protocol, or may be values related to a UE capability. The UE reports a maximum blind detection capability value and a maximum quantity-of-CCEs capability value to a network by using higher layer signaling (for example, RRC signaling). The maximum blind detection capability value and the maximum quantity-of-CCEs capability value may be respectively a maximum blind detection capability value and a maximum quantity-of-CCEs capability value that correspond to one slot, or may be a maximum blind detection capability value and a maximum quantity-of-CCEs capability value that correspond to a time unit, or may be maximum blind detection capability values and maximum quantity-of-CCEs capability values that respectively correspond to several time units. For example, the reported capability values are bound to a maximum blind detection capability value B1 and a maximum quantity-of-CCEs capability value C1 that correspond to a time unit, a maximum blind detection capability value B2 and a maximum quantity-of-CCEs capability value C2 that correspond to another time unit, and/or the like.

In a possible implementation, if none of PDCCH candidates configured by the network side device in a time unit meets the first preset condition, the network side device may indicate the terminal side device not to perform the first operation in the time unit, to reduce complexity of blind detection performed by the terminal side device.

In a possible implementation, if all CCEs included in a PDCCH candidate configured by the network side device in a time unit meet at least one of the second preset condition and the third preset condition, the network side device may indicate the terminal side device not to perform the second operation in the time unit, to reduce complexity of blind detection performed by the terminal side device.

In a possible implementation, if a quantity of blind detections that corresponds to a PDCCH candidate configured by the network side device in a time unit is less than or equal to a maximum quantity of blind detections that corresponds to the time unit, and a quantity of non-overlapping CCEs used by the terminal side device to perform channel estimation in the time unit is configured to be less than or equal to a maximum quantity of CCEs that corresponds to the time unit, the network side device may indicate the terminal side device not to perform the third operation in the time unit, to reduce complexity of blind detection performed by the terminal side device.

In a possible implementation, in a time unit of at least one time unit in which the terminal side device needs to perform the first operation, the second operation, and the third operation, it is stipulated in a protocol that a same CSS set and/or a same USS set are/is configured by the network, or it is stipulated in a protocol that all search space sets configured by the network and used for non-slot granularity-based scheduling (for example, scheduling at a granularity of each time unit included in one slot or at a granularity of a combination of a plurality of time units included in one slot) are the same, or it is stipulated in a protocol that all search space sets configured by the network and used for slot granularity-based scheduling are the same.

With reference to the foregoing descriptions, in this embodiment of this application, the network side device may configure the PDCCH candidate, to enable the terminal side device to perform only a part of the first operation to the third operation in a time unit, or not to perform the first operation to the third operation in a time unit. Therefore, overheads of blind detection of the PDCCH by the terminal side device are reduced, and efficiency of the blind detection is improved.

In this embodiment of this application, the first indication information may be implemented in a plurality of manners.

In a first implementation, the first indication information may be a bitmap, and the network side device may send the bitmap by using higher layer signaling, to indicate an operation to be performed by the terminal side device in each of the N time units. For example, the terminal side device determines, based on PDCCH configuration information delivered by a base station, a time unit pattern, e.g. span pattern, that is in one slot. It is assumed that there are three time units in one NR slot. A network side may further send a bitmap whose length is 3 to the terminal side device to indicate the terminal side device. When the bitmap is indicated as "100", the terminal side device is indicated to perform a part or all of the first operation, the second operation, and the third operation in the $1^{st}$ time unit in one slot, and in the $2^{nd}$ time unit and the $3^{rd}$ time unit that are indicated as "0", the terminal side device does not perform the first operation, the second operation, and the third operation, or performs only the third operation instead of the first operation and the second operation.

When the first indication information may be a bitmap, the first indication information includes L bits, and at least one bit in the L bits uniquely corresponds to one of the N time units, where L is an integer greater than or equal to N.

For the first time unit in the N time units, the first time unit is any one of the N time units, and different values of at least one bit in the L bits that corresponds to the first time unit indicate the terminal side device to perform at least one of the first operation, the second operation, and the third operation in the first time unit, or not to perform the first operation, the second operation, and the third operation in the first time unit.

It should be noted that a quantity of symbols included in and a location of each of the N time units in the transmission time unit may be preset. For example, one transmission time unit includes 14 symbols, and may be pre-divided into two time units. The $1^{st}$ time unit occupies the first seven symbols of the transmission time unit, and the $2^{nd}$ time unit occupies the last seven symbols of the transmission time unit. In this case, the first indication information only needs to indicate an operation to be performed by the terminal side device in each time unit.

In this implementation, a quantity of symbols included in and a location of each of the N time units in the transmission time unit may alternatively be indicated by using the first indication information. A specific indication manner is not limited in this embodiment of this application. For example, the first indication information may indicate, by using 14 bits, locations of a time unit 1 to a time unit 4 and quantities of symbols included in the time unit 1 to the time unit 4. For example, values of the 14 bits are 0000, 1111, 000, and 111, and this indicates that the time unit 1 includes a symbol 0 to a symbol 3, the time unit 2 includes a symbol 4 to a symbol 7, the time unit 3 includes a symbol 8 to a symbol 10, and the time unit 4 includes a symbol 11 to a symbol 13. Certainly, the foregoing is merely an example, and there may be another case. Details are not described herein.

In a second implementation, in this embodiment of this application, the type of each time unit may alternatively be preset. The terminal side device needs to perform different operations in different types of time units.

In this embodiment of this application, there may be a plurality of implementations of a correspondence between a type of time unit and an operation to be performed by the terminal side device. For example, because the zeroth operation is a necessary operation, and the first operation to the third operation are optional operations, correspondences between different types of time units and operations to be performed by the terminal side device may be listed in Table 1.

TABLE 1

|  | First type of time unit | Second type of time unit | Third type of time unit | Fourth type of time unit | Fifth type of time unit |
|---|---|---|---|---|---|
| First operation | √ | x | x | x | x |
| Second operation | √ | x | √ | √ | x |
| Third operation | √ | √ | x | √ | x |

In Table 1, "x" indicates that the terminal side device does not need to perform a corresponding operation in this type of time unit, and "√" indicates that the terminal side device needs to perform a corresponding operation in this type of time unit. For example, with reference to Table 1, the terminal side device performs the first operation, the second operation, and the third operation in the first type of time unit; the terminal side device performs the third operation in the second type of time unit; the terminal side device performs the second operation in the third type of time unit; the terminal side device performs the second operation and the third operation in the fourth type of time unit; the terminal side device does not perform the first operation, the second operation, and the third operation in the fifth type of time unit. Table 1 is merely an example, there may be another type of time unit, and there may be another form of the correspondence between a type of time unit and an operation to be performed by the terminal side device. Examples are not provided herein one by one for description.

In this implementation, the first indication information may be a bitmap, and an operation to be performed by the terminal side device in each time unit may be indicated as long as the type of each time unit is indicated by using the bitmap.

In a possible implementation, if there is only one type of time unit or two types of time units, one bitmap may be used to indicate a location and the type of the time unit. For example, in the bitmap, "0" indicates a first type of time unit, and "1" indicates a second type of time unit; or "1" indicates a first type of time unit, and "0" indicates a second type of time unit.

Figure 4:
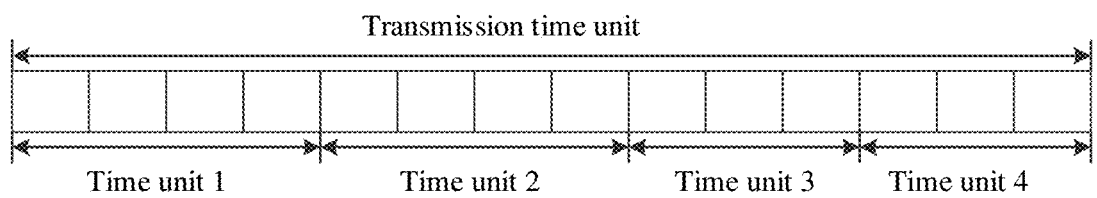
FIG. 4 is a schematic diagram of a transmission time unit according to an embodiment of this application.
Figure 5:
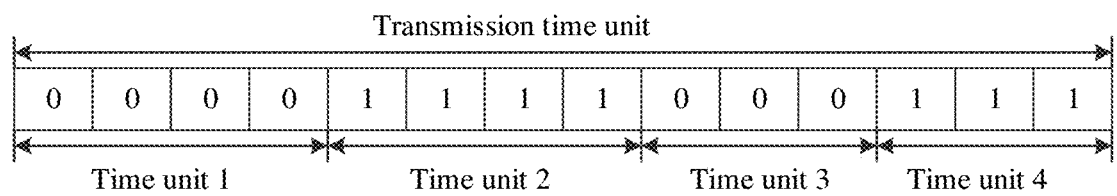
FIG. 5 is a schematic diagram of a transmission time unit according to an embodiment of this application.

For example, as shown in FIG. 4, one transmission time unit includes 14 symbols that are a symbol 0 to a symbol 13, and may be divided into four time units that are a time unit 1 to a time unit 4. The time unit 1 includes the symbol 0 to the symbol 3, the time unit 2 includes the symbol 4 to the symbol 7, the time unit 3 includes the symbol 8 to the symbol 10, and the time unit 4 includes the symbol 11 to the symbol 13. If there are only two types of time units: the first type of time unit and the second type of time unit, with reference to FIG. 4 and as shown in FIG. 5, when the time unit 1 to the time unit 4 respectively correspond to the first type of time unit, the second type of time unit, the first type of time unit, and the second type of time unit, the first indication information may include 14 bits. When the first indication information indicates the foregoing described time units, values may be as follows: 0000 1111 000 111. A bit whose value is 0 indicates a symbol included in the first type of time unit, and a bit whose value is 1 indicates a symbol included in the second type of time unit.

In another possible implementation, if more than two types of time units are included, each type of time unit corresponds to one bitmap, to separately indicate a symbol included in the type of time unit in one transmission time unit.

For example, if there are the following four types: a first type of time unit in which the first operation and the third operation are performed, a second type of time unit in which the second operation and the third operation are performed, a third type of time unit in which the first operation, the second operation, and the third operation are performed, and a fourth type of time unit in which the first operation, the second operation, and the third operation are not performed. As shown in FIG. 4, one transmission time unit includes 14 symbols that are a symbol 0 to a symbol 13, and may be divided into four time units that are a time unit 1 to a time unit 4. The time unit 1 includes the symbol 0 to the symbol 3, the time unit 2 includes the symbol 4 to the symbol 7, the time unit 3 includes the symbol 8 to the symbol 10, and the time unit 4 includes the symbol 11 to the symbol 13. When the time unit 1 to the time unit 4 respectively correspond to the first type of time unit, the third type of time unit, the second type of time unit, and the fourth type of time unit, and the first indication information is used for indication, the first indication information may include four rows of bits, and each row of bits includes 14 bits. Details are as follows: The first row is 1111 0000 000 000, the second row is 0000 0000 111 000, the third row is 0000 1111 000 000, and the fourth row is 0000 0000 000 111. In the first row, a bit whose value is 1 indicates a symbol occupied by the first type of time unit. In the second row, a bit whose value is 1 indicates a symbol occupied by the second type of time unit. In the third row, a bit whose value is 1 indicates a symbol occupied by the third type of time unit. In the fourth row, a bit whose value is 1 indicates a symbol occupied by the fourth type of time unit.

It should be noted that a quantity of symbols included in and a location of each of the N time units in the transmission time unit may be preset. With reference to the foregoing example, two bits may be used to indicate the foregoing four types, and 00, 01, 10, and 11 sequentially indicate the first type of time unit to the fourth type of time unit. When the time unit 1 to the time unit 4 respectively correspond to the first type of time unit, the third type of time unit, the second type of time unit, and the fourth type of time unit, and the first indication information is used for indication, a bitmap corresponding to the first indication information may be 00 10 01 11.

In a third implementation, a plurality of patterns may alternatively be preset. Each pattern indicates the type of each time unit, or indicates an operation to be performed by the terminal side device in each time unit, for example, indicates that at least one of the first operation, the second operation, and the third operation is to be performed or none of the first operation, the second operation, and the third operation is to be performed. Each pattern may further indicate a quantity of symbols included in and a location of each time unit in the transmission time unit. Certainly, a quantity of symbols included in and a location of each time unit in the transmission time unit may alternatively be preset, and do not need to be indicated.

In this implementation, the first indication information may be an index value, and the index value corresponds to a preset pattern.

For example, if there are only two types of time units: a first type of time unit and a second type of time unit that are respectively denoted as A and B, the first type of time unit includes three consecutive OFDM symbols, and the second type of time unit includes two consecutive OFDM symbols. When one transmission time unit includes 14 OFDM symbols, different combinations of the two types of time units in one transmission time unit may form patterns listed in Table 2.

TABLE 2

| Index value | Pattern |
| --- | --- |
| 0 | BBABBA |
| 1 | ABBABB |
| 2 | BABBAB |

In Table 2, a pattern corresponding to the index value 0 includes six time units, which are respectively a time unit 1 to a time unit 6, and time unit types corresponding to the six time units are sequentially a second type of time unit, the second type of time unit, a first type of time unit, the second type of time unit, the second type of time unit, and the first type of time unit. When the 14 OFDM symbols included in the transmission time unit are respectively an OFDM symbol 1 to an OFDM symbol 14, the time unit 1 includes the OFDM symbol 1 and the OFDM symbol 2, the time unit 2 includes the OFDM symbol 3 and the OFDM symbol 4, the time unit 3 includes the OFDM symbol 5 to the OFDM symbol 7, the time unit 4 includes the OFDM symbol 8 and the OFDM symbol 9, the time unit 5 includes the OFDM symbol 10 and the OFDM symbol 1, and the time unit 6 includes the OFDM symbol 12 to the OFDM symbol 14. For meanings of patterns corresponding to the index value 1 and the index value 2, refer to the descriptions herein. Details are not described again. With reference to Table 1, the terminal side device may perform the first operation, the second operation, and the third operation in the first type of time unit, and may perform the third operation in the second type of time unit.

In this case, when the first indication information received by the terminal side device is 0, it may be determined to perform the third operation in the time unit 1, the time unit 2, the time unit 4, and the time unit 5, and perform the first operation, the second operation, and the third operation in the time unit 3 and the time unit 6. Another case is not described.

In a possible implementation, the first indication information may alternatively be a specific location, a time unit, a plurality of specific locations, or a plurality of time units in one slot that is/are stipulated in a protocol. For example, it is stipulated in the protocol that the first operation, the second operation, and the third operation are to be performed only on the first three symbols, or it is stipulated in the protocol that the first operation, the second operation, and the third operation are to be performed in a time unit in which a common search space is located, or it is stipulated in the protocol that the first operation, the second operation, and the third operation are to be performed in a time unit in which a search space set configured with slot-based scheduling is located, or it is stipulated in the protocol that the first operation, the second operation, and the third operation are to be performed in a time unit in which a search space set configured with non-slot-based scheduling is located, or it is stipulated in the protocol that the first operation, the second operation, and the third operation are to be performed in a time unit in which a common search space set other than a common search space set in a specific format is located, for example, that the first operation, the second operation, and the third operation are to be performed in a time unit in which a search space set other than a Type 3 common search space is located.

In a possible implementation, the first indication information may alternatively indicate an operation to be performed by the terminal side device in each time unit in a plurality of transmission time units. For example, with reference to the foregoing descriptions, if there are only two types of time units: a first type of time unit and a second type of time unit that are respectively denoted as A and B, the first type of time unit includes three consecutive OFDM symbols, and the second type of time unit includes two consecutive OFDM symbols. When one transmission time unit includes 14 OFDM symbols, different combinations of the two types of time units in four or five transmission time units may form patterns listed in Table 3.

TABLE 3

| Index value | Pattern |
| --- | --- |
| 0 | BBABBA, ABBABB, BBABBA, ABBABB |
| 1 | ABBABB, BBABBA, ABBABB, BBABBA, ABBBAA |
| 2 | BABBAB, BABBAB, BBABBA, ABBABB |

In a possible implementation, one table or at least one pattern may be predefined. Each row in the predefined table indicates a possible combination of and corresponding locations of different types of time units in one transmission time unit. The at least one pattern represents a possible combination of and corresponding locations of different types of time units in one transmission time unit. The network side device further configures one transmission table for the terminal side device, where each row of the transmission table represents a possible combination of different types of time units in several transmission time units, and an element in the combination is from at least one row of configuration in the predefined table or the at least one pattern.

For example, one table, namely, Table 4, is predefined in a protocol. Table 4 includes at least one row, and corresponding locations of different types of time units in one transmission time unit are defined in each row. It is assumed that two different time unit combination patterns are defined. The network side device configures one table, namely, Table 5, for the terminal side device by using higher layer signaling, and a possible combination of different types of time units in at least a plurality of slots is defined in each row of Table 5. The network side device sends one index value to the terminal side device by using higher layer signaling or physical layer signaling, to indicate a combination of different types of time units in a plurality of transmission time units to the terminal side device. The terminal side device searches, based on the index value, Table 5 configured by the network side device, to determine a combination pattern of the different types of time units in the plurality of transmission time units.

TABLE 4

| Index value | Pattern |
| --- | --- |
| 0 | BBABBA, ABBABB |
| 1 | ABBABB, BBABBA |

TABLE 5

| Index value | Pattern |
| --- | --- |
| 0 | 000000000000000 |
| 1 | 111111111111111 |
| 2 | 101010101010101 |
| 3 | 010101010101010 |

It should be noted that, in this embodiment of this application, the first indication information may indicate a terminal operation to be performed by the terminal side device in only a part of the N time units, and a terminal operation to be performed in the other part of the time units may be implicitly indicated. For example, when there are only two types of time units, namely, a first type of time unit and a second type of time unit, the network side device indicates only a location of the first type of time unit, and all remaining symbols are a location of the second type of time unit. Similarly, when there are only three types of time units, namely, a first type of time unit, a second type of time unit, and a third type of time unit, the network side device may indicate only a location of the second type of time unit, the first type of time unit is a symbol before the location of the second type of time unit, and the third type of time unit is a symbol after the location of the second type of time unit.

In another possible implementation, the corresponding terminal operation of the terminal side device in the first time unit may not be indicated by the network side device by using the first indication information, but may be a correspondence that is between a location of a time unit and a type of the time unit and that is preset in a protocol. The terminal side device may determine a type of a time unit based on a location of the time unit, to learn of, based on the preset correspondence, a terminal operation to be performed in the time unit.

In another possible implementation, the first indication information is predefined information, and indicates that the terminal side device needs to perform a corresponding operation in a predefined time unit. For example, it is predefined in a protocol that the third operation is to be performed only in the $1^{st}$ time unit (for example, the $1^{st}$ NR Span) of an NR slot, or it is predefined in a protocol that the third operation is to be performed only in the $1^{st}$ time unit and the $2^{nd}$ time unit of a slot.

The first indication information may be semi-statically configured by using RRC layer signaling, or may be dynamically indicated by using physical downlink control information of a physical layer.

Therefore, optionally, the network side device indicates, in the first indication information, terminal operations respectively corresponding to all the time units.

In the foregoing implementation, the first indication information may be used for indication at a granularity of a transmission time unit, in other words, the first indication information does not indicate a specific transmission time unit, and the terminal side device may perform a corresponding operation based on the first indication information in N time units of each transmission time unit. In this embodiment of this application, the network side device may further determine a plurality of consecutive transmission time units, determine an operation that needs to be performed by the terminal side device in each unit of each of the plurality of consecutive transmission time units, and indicate the operation by using second indication information.

Figure 6:
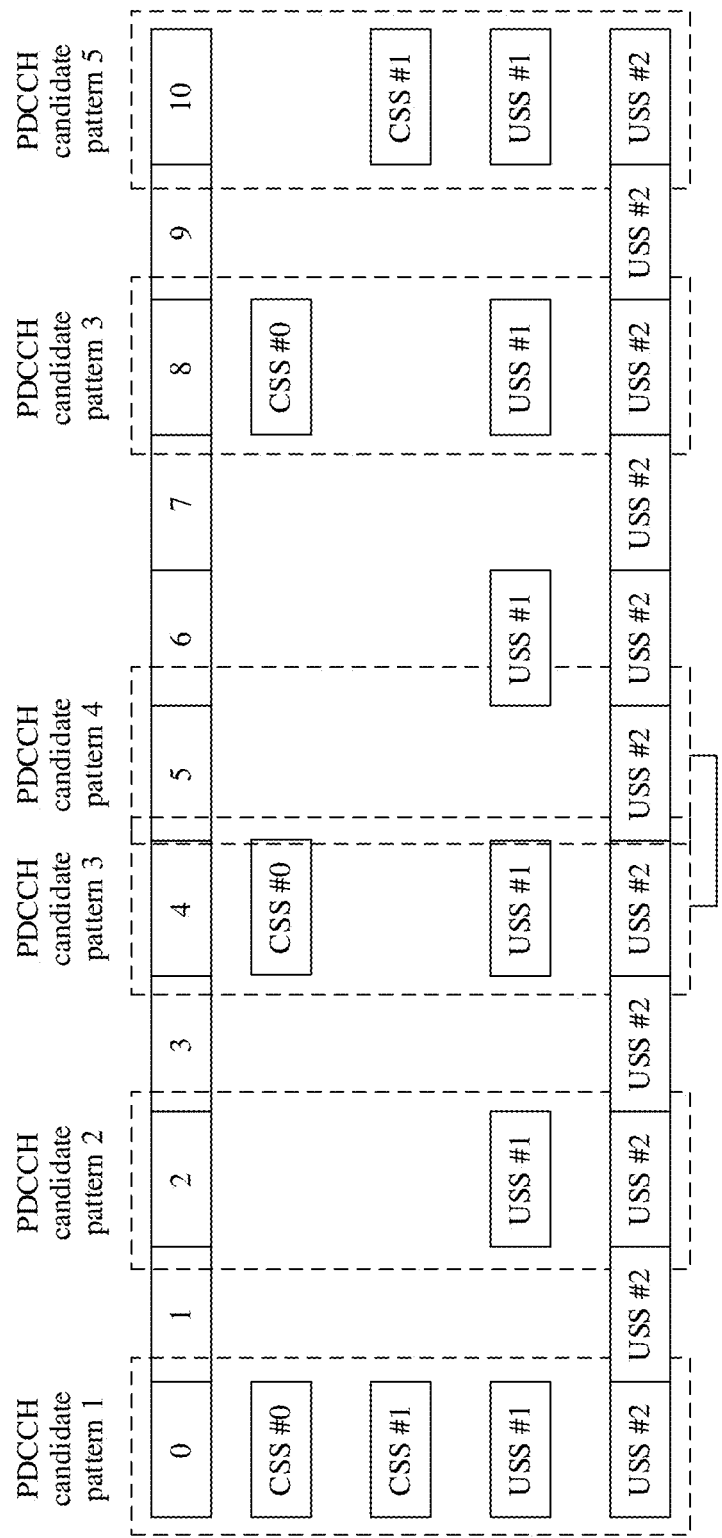
FIG. 6 is a schematic diagram of a transmission time unit according to an embodiment of this application.

Because a plurality of search space sets configured by the network side device may be different in at least one of a periodicity, an offset, and duration, frequencies at which the plurality of search space sets collide in a same transmission time unit are different. Consequently, different PDCCH candidate patterns are formed. For example, the transmission time unit is a slot. As shown in FIG. 6, a periodicity of a CSS set #0 is 4, that is, the CSS set #0 appears once every four slots; a periodicity of a CSS set #1 is 10, that is, the CSS set #1 appears once every 10 slots; a periodicity of a USS set #1 is 2, that is, the USS set #1 appears once every two slots; a periodicity of a USS set #2 is 1, that is, the USS set #2 appears once every slot. There are five different patterns, namely, five different PDCCH candidate patterns, in which different search space sets collide in a same slot. A quantity of PDCCH candidate patterns configured by the network side device is restricted in a protocol not to exceeding N, or a quantity of candidate patterns based on which a PDCCH mapping rule needs to be performed is restricted in a protocol not to exceeding M, where M may be less than or equal to N. Performing the PDCCH mapping rule may be performing the zeroth operation to the third operation.

Possibly, the network side device may notify, by using a combination of a bitmap or a table that is configured by using higher layer signaling or is predefined and a semi-static configuration or a group common indication of the network side device, the terminal side device of a pattern that is in N different PDCCH candidate patterns and based on which the PDCCH mapping rule needs to be performed.

Possibly, in this method, the network side device does not need to send any indication information to the terminal side device, and the network side device ensures that a configuration does not exceed a processing capability of the terminal side device, for example, does not exceed a storage capability and a computing capability of the terminal side device. Alternatively, the terminal side device reports a capability to notify the network side device that the terminal side device can process several different PDCCH candidate patterns, and the network side device performs corresponding configuration for the terminal side device based on the capability reported by the terminal side device, to ensure that processing complexity does not exceed the capability reported by the terminal side device.

For example, the quantity of PDCCH candidate patterns configured by the network side device is 5, and the quantity of PDCCH candidate patterns based on which the PDCCH mapping rule needs to be performed is 3. That is, PDCCH candidate patterns 1, 3, and 5 are slots in which the PDCCH mapping rule is to be performed, and the network side device ensures that CCEs of configured PDCCH candidates do not overlap in remaining slots in which only the third operation may or may not be performed.

In FIG. 6, the network side device configures possible PDCCH candidate patterns of all slots for the terminal side device. According to the foregoing method, during RRC configuration/reconfiguration, a transition time period may be used to calculate the PDCCH mapping rule, and then a calculation result is stored. The terminal side device does not need to perform the PDCCH mapping rule slot by slot to perform selective mapping on the PDCCH candidates, to reduce processing complexity of the terminal side device, that is, the terminal side device performs the zeroth operation to the third operation only once in the first periodicity, and only needs to read, in another periodicity, a performing result of the first periodicity.

Figure 7:
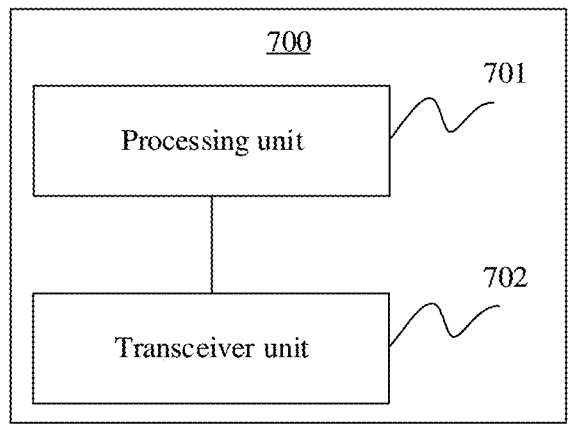
FIG. 7 is a schematic structural diagram of a communication apparatus according to an embodiment of this application.

FIG. 7 is a schematic structural diagram of a communication apparatus 700 according to an embodiment of this application. The communication apparatus may be configured to perform an action of the network side device in the foregoing method embodiments. The communication apparatus 700 includes a transceiver unit 702 and a processing unit 701.

The processing unit 701 is configured to determine first indication information.

The first indication information is used to indicate N time units, and is used to indicate a terminal side device to perform at least one of a first operation, a second operation, and a third operation or not to perform the first operation, the second operation, and the third operation in each of the N time units; the N time units belong to a same transmission time unit, each of the N time units includes at least one symbol, and N is an integer greater than 0; and the first operation is used to determine a quantity of blind detections to be performed on a physical downlink control channel PDCCH in a current time unit, the second operation is used to determine a quantity of non-overlapping control channel elements CCEs used for channel estimation on the PDCCH in the current time unit, and the third operation is used to determine whether the quantity of blind detections to be performed on the PDCCH in the current time unit is greater than a maximum quantity of blind detections that corresponds to the current time unit, and/or is used to determine whether the quantity of non-overlapping CCEs in the current time unit is greater than a maximum quantity of CCEs that corresponds to the current time unit.

The transceiver unit 702 is configured to send the first indication information to the terminal side device.

In a possible implementation, the first indication information includes L bits, and at least one bit in the L bits uniquely corresponds to a first time unit in the N time units, where L is an integer greater than or equal to N.

Different bit status values of the at least one bit corresponding to the first time unit indicate a corresponding terminal operation of the terminal side device in the first time unit.

In a possible implementation, the first indication information is an index value, and a pattern corresponding to the index value indicates locations of the N time units in the transmission time unit, and indicates the corresponding terminal operation in the first time unit.

Figure 8:
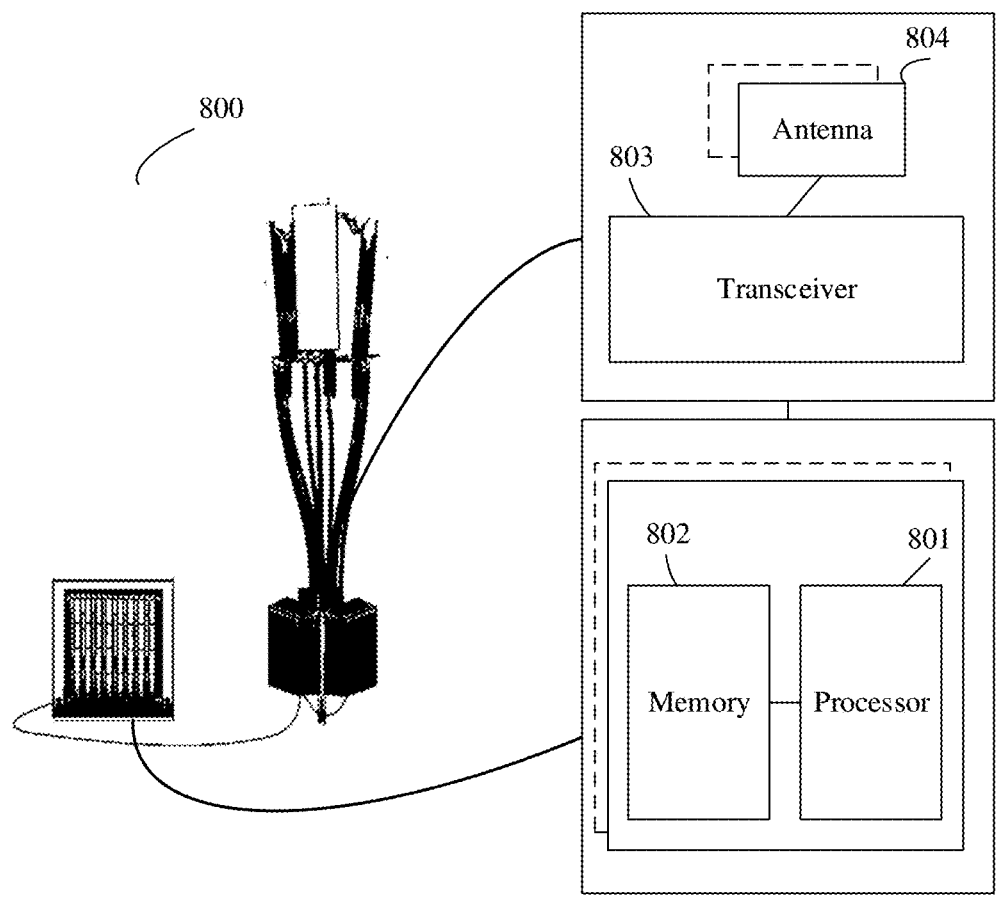
FIG. 8 is a schematic structural diagram of a communication apparatus according to an embodiment of this application.

FIG. 8 is a schematic structural diagram of a communication apparatus according to an embodiment of this application. The communication apparatus shown in FIG. 8 may be an implementation of a hardware circuit of the communication apparatus shown in FIG. 7. The communication apparatus may be used in the procedure shown in FIG. 2, and performs a function of the network device in the foregoing method embodiment. For ease of description, FIG. 8 shows only main components of the communication apparatus. Optionally, the communication apparatus may be a network device, or may be an apparatus, for example, a chip or a chip system, in the network device. The chip system includes at least one chip, and the chip system may further include another circuit structure and/or discrete component. Optionally, using an example in which the communication apparatus is a network device, as shown in FIG. 8, the communication apparatus 800 includes a processor 801, a memory 802, a transceiver 803, an antenna 804, and the like.

The processor 801 is configured to determine first indication information.

The first indication information is used to indicate N time units, and is used to indicate a terminal side device to perform at least one of a first operation, a second operation, and a third operation or not to perform the first operation, the second operation, and the third operation in each of the N time units; the N time units belong to a same transmission time unit, each of the N time units includes at least one symbol, and N is an integer greater than 0; and the first operation is used to determine a quantity of blind detections to be performed on a physical downlink control channel PDCCH in a current time unit, the second operation is used to determine a quantity of non-overlapping control channel elements CCEs used for channel estimation on the PDCCH in the current time unit, and the third operation is used to determine whether the quantity of blind detections to be performed on the PDCCH in the current time unit is greater than a maximum quantity of blind detections that corresponds to the current time unit, and/or is used to determine whether the quantity of non-overlapping CCEs in the current time unit is greater than a maximum quantity of CCEs that corresponds to the current time unit.

The transceiver 803 is configured to send the first indication information to the terminal side device.

In a possible implementation, the first indication information includes L bits, and at least one bit in the L bits uniquely corresponds to a first time unit in the N time units, where L is an integer greater than or equal to N.

Different bit status values of the at least one bit corresponding to the first time unit indicate a corresponding terminal operation of the terminal side device in the first time unit.

In a possible implementation, the first indication information is an index value, and a pattern corresponding to the index value indicates locations of the N time units in the transmission time unit, and indicates the corresponding terminal operation in the first time unit.

Figure 9:
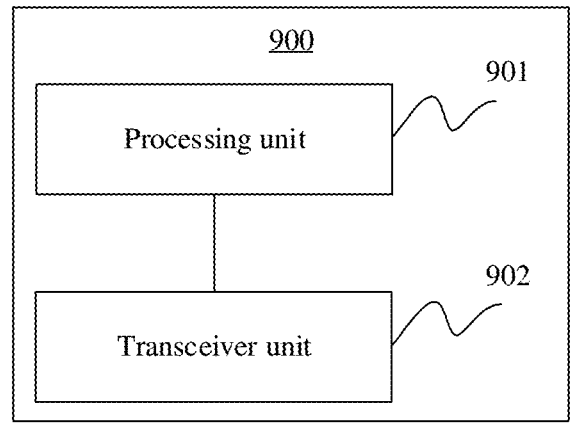
FIG. 9 is a schematic structural diagram of a communication apparatus according to an embodiment of this application.

FIG. 9 is a schematic structural diagram of a communication apparatus according to an embodiment of this application. The communication apparatus may be configured to perform an action of the terminal side device in the foregoing method embodiments. The communication apparatus 900 includes a transceiver unit 902 and a processing unit 901.

The transceiver unit 902 is configured to receive first indication information from a network side device.

The first indication information is used to indicate at least one of N time units, any one of the N time units is a first time unit, the first time unit in the N time units corresponds to a type of terminal operation, the terminal operation is being prohibited from performing a first operation, a second operation, and a third operation, or is performing at least one of the first operation, the second operation, and the third operation, the N time units belong to a same transmission time unit, and any one of the N time units includes at least one symbol, where N is an integer greater than 0.

The first operation is used to determine a quantity of blind detections to be performed on a physical downlink control channel PDCCH in a current time unit, the second operation is used to determine a quantity of non-overlapping control channel elements CCEs used for channel estimation on the PDCCH in the current time unit, and the third operation is used to determine whether the quantity of blind detections to be performed on the PDCCH in the current time unit is greater than a maximum quantity of blind detections that corresponds to the current time unit, and/or is used to determine whether the quantity of non-overlapping CCEs in the current time unit is greater than a maximum quantity of CCEs that corresponds to the current time unit.

The processing unit 901 is configured to determine the N time units based on the first indication information, and perform the corresponding terminal operation in the first time unit in the N time units.

In a possible design, when the corresponding terminal operation includes the first operation, that the terminal side device performs the first operation in the first time unit based on the first indication information includes:

the terminal side device determines, based on a first preset condition, a quantity of blind detections to be performed on the PDCCH on M PDCCH candidates in the first time unit, where the M PDCCH candidates are configured by the network side device in the first time unit, and M is an integer greater than 0.

If any two PDCCH candidates in the M PDCCH candidates meet the first preset condition, the two PDCCH candidates correspond to one blind detection; otherwise, the two PDCCH candidates correspond to two blind detections.

In a possible design, when the corresponding terminal operation includes the second operation, that the terminal side device performs the second operation in the first time unit based on the first indication information includes:

the terminal side device determines, based on a second preset condition and a third preset condition, a quantity of non-overlapping CCEs included in the M PDCCH candidates located in the first time unit, where the M PDCCH candidates are configured by the network side device in the first time unit, and M is an integer greater than 0.

For any two CCEs in the M PDCCH candidates, when the two CCEs are from different PDCCH candidates, if the two CCEs meet at least one of the second preset condition and the third preset condition, the two CCEs are two non-overlapping CCEs; otherwise, the two CCEs are one CCE, for example, one non-overlapping CCE.

In a possible design, for the first time unit in the N time units, when the first indication information is used to indicate the terminal side device to perform the third operation in the first time unit, that the terminal side device performs the third operation in the first time unit based on the first indication information includes:

the terminal side device performs the following operation for an $i^{th}$ search space set in P search space sets based on a priority sequence of the P search space sets configured by the network side device:

determining, by the terminal side device, whether a quantity, of blind detections, corresponding to a PDCCH candidate that is located in the first time unit and that is in a PDCCH candidate included in the first search space set to the $i^{th}$ search space set is greater than a maximum quantity of blind detections that corresponds to the first time unit, and determining, if the quantity of blind detections is greater than the maximum quantity of blind detections, not to perform blind detection on the PDCCH in the $i^{th}$ search space set, where i is an integer greater than or equal to 1 and less than or equal to P; or determining, by the terminal side device, whether a quantity of non-overlapping CCEs included in a PDCCH candidate that is located in the first time unit and that is in a PDCCH candidate included in the first search space set to the $i^{th}$ search space set is greater than a maximum quantity of CCEs that corresponds to the first time unit, and determining, if the quantity of non-overlapping CCEs is greater than the maximum quantity of CCEs, not to perform blind detection on the PDCCH in the $i^{th}$ search space set; or if determining that a quantity, of blind detections, corresponding to a PDCCH candidate that is located in the first time unit and that is in a PDCCH candidate included in the first search space set to the $i^{th}$ search space set is less than or equal to a maximum quantity of blind detections that corresponds to the first time unit, and determining that a quantity of non-overlapping CCEs included in the PDCCH candidate that is located in the first time unit and that is in the PDCCH candidate included in the first search space set to the $i^{th}$ search space set is less than or equal to a maximum quantity of CCEs that corresponds to the first time unit, determining, by the terminal side device, to perform blind detection on the PDCCH in the $i^{th}$ search space set.

In a possible implementation, the first indication information includes L bits, and at least one bit in the L bits uniquely corresponds to the first time unit in the N time units, where L is an integer greater than or equal to N.

Different bit status values of the at least one bit corresponding to the first time unit indicate the corresponding terminal operation of the terminal side device in the first time unit.

In a possible implementation, the first indication information is an index value, and a pattern corresponding to the index value indicates locations of the N time units in the transmission time unit, and indicates the corresponding terminal operation in the first time unit.

Figure 10:
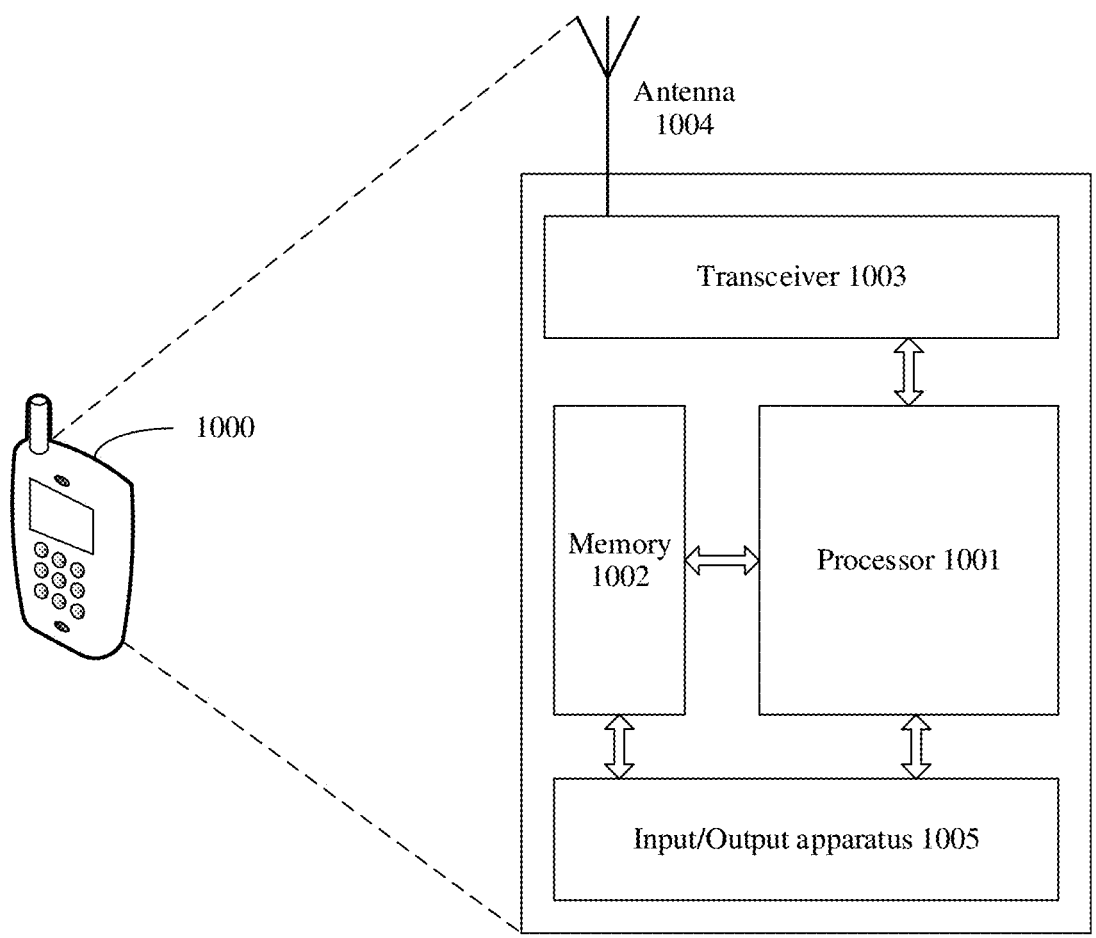
FIG. 10 is a schematic structural diagram of a communication apparatus according to an embodiment of this application.

FIG. 10 is a schematic structural diagram of a communication apparatus according to an embodiment of this application. The communication apparatus shown in FIG. 10 may be an implementation of a hardware circuit of the communication apparatus shown in FIG. 9. The communication apparatus may be used in the procedure shown in FIG. 2, and performs a function of the terminal side device in the foregoing method embodiment. For ease of description, FIG. 10 shows only main components of the communication apparatus. Optionally, the communication apparatus may be a terminal side device, or may be an apparatus, for example, a chip or a chip system, in the terminal side device. The chip system includes at least one chip, and the chip system may further include another circuit structure and/or discrete component. Optionally, using an example in which the communication apparatus is a terminal side device, as shown in FIG. 10, the communication apparatus 1000 includes a processor 1001, a memory 1002, a transceiver 1003, an antenna 1004, and an input/output apparatus 1005. The processor 1001 is mainly configured to process a communication protocol and communication data, control the entire wireless communication apparatus, execute a software program, and process data of the software program. For example, the processor 1001 is configured to support the wireless communication apparatus in performing the action described in the foregoing method embodiment. The memory 1002 is mainly configured to store the software program and the data. The transceiver 1003 is mainly configured to: perform conversion between a baseband signal and a radio frequency signal, and process the radio frequency signal. The antenna 1004 is mainly configured to receive and send a radio frequency signal in a form of an electromagnetic wave. The input/output apparatus 1005, for example, a touchscreen, a display screen, or a keyboard, is mainly configured to receive data entered by a user and output data to the user.

The transceiver 1003 is configured to receive first indication information from a network side device.

The first indication information is used to indicate N time units, and is used to indicate the terminal side device to perform at least one of a first operation, a second operation, and a third operation or not to perform the first operation, the second operation, and the third operation in each of the N time units; the N time units belong to a same transmission time unit, each of the N time units includes at least one symbol, and N is an integer greater than 0; and the first operation is used to determine a quantity of blind detections to be performed on a physical downlink control channel PDCCH in a current time unit, the second operation is used to determine a quantity of non-overlapping control channel elements CCEs used for channel estimation on the PDCCH in the current time unit, and the third operation is used to determine whether the quantity of blind detections to be performed on the PDCCH in the current time unit is greater than a maximum quantity of blind detections that corresponds to the current time unit, and/or is used to determine whether the quantity of non-overlapping CCEs in the current time unit is greater than a maximum quantity of CCEs that corresponds to the current time unit.

The processor 1001 is configured to perform, in each of the N time units, an operation indicated by the first indication information.

In a possible design, when the corresponding terminal operation includes the first operation, the processor 1001 is specifically configured to: determine, based on a first preset condition, a quantity of blind detections to be performed on the PDCCH on M PDCCH candidates in the first time unit, where the M PDCCH candidates are configured by the network side device in the first time unit, and M is an integer greater than 0.

If any two PDCCH candidates in the M PDCCH candidates meet the first preset condition, the two PDCCH candidates correspond to one blind detection; otherwise, the two PDCCH candidates correspond to two blind detections.

In a possible design, when the corresponding terminal operation includes the second operation, the processor 1001 is specifically configured to: determining, by the terminal side device based on a second preset condition and a third preset condition, a quantity of non-overlapping CCEs included in the M PDCCH candidates located in the first time unit, where the M PDCCH candidates are configured by the network side device in the first time unit, and M is an integer greater than 0.

For any two CCEs in the M PDCCH candidates, when the two CCEs are from different PDCCH candidates, if the two CCEs meet at least one of the second preset condition and the third preset condition, the two CCEs are two non-overlapping CCEs; otherwise, the two CCEs are one CCE, for example, one non-overlapping CCE.

In a possible design, for the first time unit in the N time units, when the first indication information is used to indicate the terminal side device to perform the third operation in the first time unit, the processor 1001 is specifically configured to: perform the following operation for an $i^{th}$ search space set in P search space sets based on a priority sequence of the P search space sets configured by the network side device: determining whether a quantity, of blind detections, corresponding to a PDCCH candidate that is located in the first time unit and that is in a PDCCH candidate included in the first search space set to the $i^{th}$ search space set is greater than a maximum quantity of blind detections that corresponds to the first time unit, and determining, if the quantity of blind detections is greater than the maximum quantity of blind detections, not to perform blind detection on the PDCCH in the $i^{th}$ search space set, where i is an integer greater than or equal to 1 and less than or equal to P; or determining whether a quantity of non-overlapping CCEs included in a PDCCH candidate that is located in the first time unit and that is in a PDCCH candidate included in the first search space set to the $i^{th}$ search space set is greater than a maximum quantity of CCEs that corresponds to the first time unit, and determining, if the quantity of non-overlapping CCEs is greater than the maximum quantity of CCEs, not to perform blind detection on the PDCCH in the $i^{th}$ search space set; or if determining that a quantity, of blind detections, corresponding to a PDCCH candidate that is located in the first time unit and that is in a PDCCH candidate included in the first search space set to the $i^{th}$ search space set is less than or equal to a maximum quantity of blind detections that corresponds to the first time unit, and determining, by the terminal side device, that a quantity of non-overlapping CCEs included in the PDCCH candidate that is located in the first time unit and that is in the PDCCH candidate included in the first search space set to the $i^{th}$ search space set is less than or equal to a maximum quantity of CCEs that corresponds to the first time unit, determining to perform blind detection on the PDCCH in the $i^{th}$ search space set.

In a possible implementation, the first indication information includes L bits, and at least one bit in the L bits uniquely corresponds to the first time unit in the N time units, where L is an integer greater than or equal to N.

Different bit status values of the at least one bit corresponding to the first time unit indicate the corresponding terminal operation of the terminal side device in the first time unit.

In a possible implementation, the first indication information is an index value, and a pattern corresponding to the index value indicates locations of the N time units in the transmission time unit, and indicates the corresponding terminal operation in the first time unit.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method applied to a terminal side device, the method comprising:
receiving first indication information from a network side device;
determining N spans based on the first indication information, and determining to perform a first operation, a second operation and a third operation in a first span of the N spans, and not to perform or to perform a part of the first operation, the second operation and the third operation according to a processing capability of the terminal side device in another span in the N spans;
wherein the N spans belong to a same slot, and each of the N spans comprises at least one symbol, wherein N is an integer greater than 1; and
the first operation comprises determining a quantity of blind detections to be performed on a physical downlink control channel (PDCCH) in a span, the second operation comprises determining a quantity of non-overlapping control channel elements (CCEs) used for channel estimation on the PDCCH in the span, and the third operation comprises determining whether the quantity of blind detections to be performed on the PDCCH in the span is greater than a maximum quantity of blind detections that corresponds to the span, and/or determining whether the quantity of non-overlapping CCEs in the span is greater than a maximum quantity of CCEs that corresponds to the span;
wherein performing the third operation in the first span comprises performing the following operation for an $i^{th}$ search space set in P search space sets based on a priority sequence of the P search space sets configured by the network side device:
determining whether a quantity of blind detections corresponding to one or more PDCCH candidates that are located in the first span and that are comprised in a first search space set to the $i^{th}$ search space set is greater than a maximum quantity of blind detections that corresponds to the first span, and determining, when the quantity of blind detections is greater than the maximum quantity of blind detections, not to perform blind detection on the PDCCH in the $i^{th}$ search space set, wherein i is an integer greater than or equal to 1 and less than or equal to P;
determining whether a quantity of non-overlapping CCEs comprised in one or more PDCCH candidates that are located in the first span and that are comprised in the first search space set to the $i^{th}$ search space set is greater than a maximum quantity of CCEs that corresponds to the first span, and determining, when the quantity of non-overlapping CCEs is greater than the maximum quantity of CCEs, not to perform blind detection on the PDCCH in the $i^{th}$ search space set: or
when determining that a quantity of blind detections corresponding to one or more PDCCH candidates that are located in the first span and that are comprised in the first search space set to the $i^{th}$ search space set is less than or equal to a maximum quantity of blind detections that corresponds to the first span, and determining that a quantity of non-overlapping CCEs comprised in the PDCCH candidate that is located in the first span and that is in the PDCCH candidate comprised in the first search space set to the $i^{th}$ search space set is less than or equal to a maximum quantity of CCEs that corresponds to the first span, determining, by the terminal side device, to perform blind detection on the PDCCH in the $i^{th}$ search space set.

2. The method according to claim 1, wherein determining to perform the first operation, the second operation and the third operation in the first span of the N spans comprises:
determining, according to a position of the first span within the slot, to perform the first operation, the second operation, and the third operation in the first span of the N spans.

3. The method according to claim 1, wherein determining not to perform the first operation, the second operation, and the third operation in the another span comprises:
determining, according to a position of the another span within the slot, not to perform the first operation, the second operation, and the third operation in the another span.

4. The method according to claim 3, wherein performing the first operation in the first span comprises:
determining, based on a first preset condition, a quantity of blind detections to be performed on the PDCCH on M PDCCH candidates in the first span, wherein the M PDCCH candidates are configured by the network side device in the first span, and M is an integer greater than 0, wherein when any two PDCCH candidates in the M PDCCH candidates meet the first preset condition, the any two PDCCH candidates correspond to one blind detection; otherwise, the any two PDCCH candidates correspond to two blind detections.

5. The method according to claim 4, wherein the first preset condition comprises the following content:
the any two PDCCH candidates correspond to a same CCE set;
the any two PDCCH candidates have a same scrambling code sequence;
the any two PDCCH candidates are from a same control resource set (CORESET); and
lengths of downlink control information (DCI) on which blind detection is performed by the terminal side device on the any two PDCCH candidates are the same.

6. The method according to claim 3, wherein performing the second operation in the first span comprises:
determining, based on a second preset condition and a third preset condition, a quantity of non-overlapping CCEs comprised in M PDCCH candidates located in the first span, wherein the M PDCCH candidates are configured by the network side device in the first span, and M is an integer greater than 0, wherein
for any two CCEs in the M PDCCH candidates, when the any two CCEs are from different PDCCH candidates, and when the any two CCEs meet at least one of the second preset condition or the third preset condition, the any two CCEs are two non-overlapping CCEs; otherwise, the any two CCEs are one non-overlapping CCE.

7. The method according to claim 6, wherein the second preset condition is that the any two CCEs are from different control resource sets (CORESETs); and
the third preset condition is that moments at which the terminal side device performs blind detection on the PDCCH on two PDCCH candidates corresponding to the any two CCEs are different.

8. The method according to claim 1, wherein each span within the N spans is a new radio (NR) span and the slot is a NR slot.

9. An apparatus, comprising: a processor and a memory storing instructions; wherein the instructions are executed by the processor to cause the apparatus perform operations of:
receiving first indication information from a network side device; and
determining N spans based on the first indication information, and determining to perform a first operation, a second operation, and a third operation in a first span of the N spans and not to perform or to perform a part of the first operation, the second operation and the third operation according to a processing capability of the apparatus in another span in the N spans;
wherein the N spans belong to a same slot, and each of the N spans comprises at least one symbol, wherein N is an integer greater than 1; and
the first operation comprises determining a quantity of blind detections to be performed on a physical downlink control channel (PDCCH) in a span, the second operation comprises determining a quantity of non-overlapping control channel elements (CCEs) used for channel estimation on the PDCCH in the span, and the third operation comprises determining whether the quantity of blind detections to be performed on the PDCCH in the span is greater than a maximum quantity of blind detections that corresponds to the span, and/or determining whether the quantity of non-overlapping CCEs in the span is greater than a maximum quantity of CCEs that corresponds to the span;
wherein performing the third operation in the first span comprises performing the following operation for an $i^{th}$ search space set in P search space sets based on a priority sequence of the P search space sets configured by the network side device:
determining whether a quantity of blind detections corresponding to one or more PDCCH candidates that are located in the first span and that are comprised in a first search space set to the $i^{th}$ search space set is greater than a maximum quantity of blind detections that corresponds to the first span, and determining, when the quantity of blind detections is greater than the maximum quantity of blind detections, not to perform blind detection on the PDCCH in the $i^{th}$ search space set, wherein i is an integer greater than or equal to 1 and less than or equal to P; or
determining whether a quantity of non-overlapping CCEs comprised in one or more PDCCH candidates that are located in the first span and that are comprised in the first search space set to the $i^{th}$ search space set is greater than a maximum quantity of CCEs that corresponds to the first span, and determining, when the quantity of non-overlapping CCEs is greater than the maximum quantity of CCEs, not to perform blind detection on the PDCCH in the $i^{th}$ search space set: or
when determining that a quantity, of blind detections, corresponding to one or more PDCCH candidates that are located in the first span and that are comprised in the first search space set to the $i^{th}$ search space set is less than or equal to a maximum quantity of blind detections that corresponds to the first span, and determining that a quantity of non-overlapping CCEs comprised in the PDCCH candidate that is located in the first span and that is in the PDCCH candidate comprised in the first search space set to the $i^{th}$ search space set is less than or equal to a maximum quantity of CCEs that corresponds to the first span, determining, by the apparatus, to perform blind detection on the PDCCH in the $i^{th}$ search space set.

10. The apparatus according to claim 9, wherein determining to perform the first operation, the second operation and the third operation in the first span of the N spans comprises:
determining, according to a position of the first span within the slot, to perform the first operation, the second operation, and the third operation.

11. The apparatus according to claim 9, wherein determining not to perform the first operation, the second operation, and the third operation in the another span comprises:
determining according to a position within the slot of the another span, not to perform the first operation, the second operation, and the third operation.

12. The apparatus according to claim 11, wherein performing the first operation in the first span comprises:
determining, based on a first preset condition, a quantity of blind detections to be performed on the PDCCH on M PDCCH candidates in the first span, wherein the M PDCCH candidates are configured by the network side device in the first span, and M is an integer greater than 0, wherein
when any two PDCCH candidates in the M PDCCH candidates meet the first preset condition, the any two PDCCH candidates correspond to one blind detection; otherwise, the any two PDCCH candidates correspond to two blind detections.

13. The apparatus according to claim 12, wherein the first preset condition comprises the following content:
- the any two PDCCH candidates correspond to a same CCE set;
- the any two PDCCH candidates have a same scrambling code sequence;
- the any two PDCCH candidates are from a same control resource set (CORESET); and
- lengths of downlink control information (DCI) on which blind detection is performed by the apparatus on the any two PDCCH candidates are the same.

14. The apparatus according to claim 11, wherein performing the second operation in the first span comprises:
- determining, based on a second preset condition and a third preset condition, a quantity of non-overlapping CCEs comprised in M PDCCH candidates located in the first span, wherein the M PDCCH candidates are configured by the network side device in the first span, and M is an integer greater than 0, wherein
- for any two CCEs in the M PDCCH candidates, when the any two CCEs are from different PDCCH candidates, when the any two CCEs meet at least one of the second preset condition and the third preset condition, the any two CCEs are two non-overlapping CCEs; otherwise, the any two CCEs are one non-overlapping CCE.

15. The apparatus according to claim 14, wherein the second preset condition is that the any two CCEs are from different control resource sets (CORESETs); and
- the third preset condition is that moments at which the apparatus performs blind detection on the PDCCH on two PDCCH candidates corresponding to the any two CCEs are different.

16. The apparatus according to claim 9, wherein each span within the N spans is a new radio (NR) span and the slot is a NR slot.

* * * * *

UNITED STATES PATENT AND TRADEMARK OFFICE
CERTIFICATE OF CORRECTION

PATENT NO. : 12,021,666 B2
APPLICATION NO. : 17/487859
DATED : June 25, 2024
INVENTOR(S) : Gao et al.

It is certified that error appears in the above-identified patent and that said Letters Patent is hereby corrected as shown below:

In the Claims

In Column 34, in Claim 1, Line 31, delete "set:" and insert -- set; --.

In Column 34, in Claim 4, Line 67, delete "o," and insert -- 0, --.

In Column 36, in Claim 9, Line 27, delete "set:" and insert -- set; --.

Signed and Sealed this
Thirtieth Day of July, 2024

Katherine Kelly Vidal
*Director of the United States Patent and Trademark Office*